US011665352B2

(12) United States Patent
Senzaki et al.

(10) Patent No.: US 11,665,352 B2
(45) Date of Patent: May 30, 2023

(54) VIDEO ENCODING DEVICE, VIDEO DECODING DEVICE, VIDEO ENCODING METHOD, VIDEO DECODING METHOD, AND PROGRAM USING INTER PREDICTION

(71) Applicant: NEC Corporation, Tokyo (JP)

(72) Inventors: Kenta Senzaki, Tokyo (JP); Yuzo Senda, Tokyo (JP); Keiichi Chono, Tokyo (JP); Hirofumi Aoki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/685,543

(22) Filed: Mar. 3, 2022

(65) Prior Publication Data

US 2022/0191505 A1 Jun. 16, 2022

Related U.S. Application Data

(63) Continuation of application No. 17/060,828, filed on Oct. 1, 2020, now Pat. No. 11,323,720, which is a
(Continued)

(30) Foreign Application Priority Data

Jan. 13, 2011 (JP) .................................. 2011-004963

(51) Int. Cl.
*H04N 11/02* (2006.01)
*H04N 19/139* (2014.01)
(Continued)

(52) U.S. Cl.
CPC ......... *H04N 19/139* (2014.11); *H04N 19/109* (2014.11); *H04N 19/119* (2014.11);
(Continued)

(58) Field of Classification Search
CPC .................................................... H04N 19/139
(Continued)

(56) References Cited

U.S. PATENT DOCUMENTS

| 2002/0037051 A1 | 3/2002 | Takenaka |
| 2005/0249290 A1 | 11/2005 | Gordon et al. |

(Continued)

FOREIGN PATENT DOCUMENTS

| CN | 101394560 A | 3/2009 |
| CN | 101690235 A | 3/2010 |

(Continued)

OTHER PUBLICATIONS

Communication dated Sep. 6, 2016, issued by the Korean Intellectual Property Office in corresponding Korean Application No. 10-2016-7022895.
(Continued)

*Primary Examiner* — Leron Beck
(74) *Attorney, Agent, or Firm* — Sughrue Mion, PLLC

(57) ABSTRACT

A video encoding device includes encoding control means 11 for controlling an inter-PU partition type of a CU to be encoded, based on the maximum number (PA) of motion vectors allowed for an image block having a predetermined area and the number (PB) of motion vectors of an encoded image block contained in the image block having the predetermined area. A video decoding device includes decoding control means for controlling an inter-PU partition type of a CU to be decoded, based on the maximum number (PA) of motion vectors allowed for an image block having a predetermined area and the number (PB) of motion vectors of a decoded image block contained in the image block having the predetermined area.

2 Claims, 21 Drawing Sheets

Related U.S. Application Data continuation of application No. 13/977,756, filed as application No. PCT/JP2012/000045 on Jan. 5, 2012, now Pat. No. 10,841,588.

(51) Int. Cl.

| | | |
|---|---|---|
| *H04N 19/61* | (2014.01) | |
| *H04N 19/109* | (2014.01) | |
| *H04N 19/119* | (2014.01) | |
| *H04N 19/176* | (2014.01) | |
| *H04N 19/46* | (2014.01) | |
| *H04N 19/51* | (2014.01) | |
| *H04N 19/147* | (2014.01) | |
| *H04N 19/70* | (2014.01) | |
| *H04N 19/91* | (2014.01) | |
| *H04N 19/65* | (2014.01) | |

(52) U.S. Cl.
CPC ......... *H04N 19/147* (2014.11); *H04N 19/176* (2014.11); *H04N 19/46* (2014.11); *H04N 19/51* (2014.11); *H04N 19/61* (2014.11); *H04N 19/70* (2014.11); *H04N 19/65* (2014.11); *H04N 19/91* (2014.11)

(58) Field of Classification Search
USPC ..................................... 375/240.01–240.29
See application file for complete search history.

(56) References Cited

U.S. PATENT DOCUMENTS

| | | | |
|---|---|---|---|
| 2007/0147503 A1 | 6/2007 | Ikeda et al. | |
| 2008/0240246 A1 | 10/2008 | Lee .................. | H04N 19/51 375/204.16 |
| 2008/0304569 A1 | 12/2008 | Lee .................. | H04N 19/14 375/240.16 |
| 2009/0028241 A1 | 1/2009 | Takahashi et al. | |
| 2009/0316791 A1 | 12/2009 | Chujoh et al. | |
| 2011/0002380 A1 | 1/2011 | Yang .................. | H04N 19/114 375/240.02 |
| 2011/0164677 A1 | 7/2011 | Lu .................. | H04N 19/11 375/240.02 |
| 2012/0134416 A1 | 5/2012 | Lin .................. | H04N 19/52 375/240.16 |
| 2012/0147961 A1 | 6/2012 | Guo .................. | H04N 19/147 375/240.16 |
| 2013/0077691 A1 | 3/2013 | Zheng .................. | H04N 19/176 375/240.16 |

FOREIGN PATENT DOCUMENTS

| | | |
|---|---|---|
| CN | 101822061 A | 9/2010 |
| JP | 2007-060452 A | 3/2007 |
| JP | 2007-180776 A | 7/2007 |
| WO | 2009/114054 A1 | 9/2009 |
| WO | 2010/039728 A2 | 4/2010 |
| WO | 2011/019250 A2 | 2/2011 |
| WO | 2012/017858 A1 | 2/2012 |

OTHER PUBLICATIONS

Communication dated Jan. 16, 2018, from Korean Intellectual Property Office in counterpart application No. 10-2015-7022459.
Yoshinori Suzuki., "Reduction of MC Memory Access using Adaptive MV Coding", The Institute of Electronics, Information and Communication Engineers, Technical Report of IEICE, CS2003-130, IE2003-120(Dec. 2003), vol. 103, No. 513, Dec. 2003, pp. 35-40.
Chono, et al., "Description of video coding technology proposal by NEC", JCTVC-A104, JCT-VC Meeting, Apr. 15-23, 2010, Dresden, XP030007534, 30 pages.
"Information technology—coding of audio-visual objects—Part 10: Advanced Video Coding", International Standard, ISO/IEC 14496-10, May 15, 2009, pp. 1-118, Fifth Edition.
Communication dated Jan. 16, 2018, from Korean Intellectual Property Office in counterpart application No. 10-2013-7016920.
Communication dated Dec. 15, 2015, from the Japanese Patent Office in counterpart application No. 2012-552666.
Naito, et al., "Efficient coding scheme for super high definition video based on extending H.264 high profile", Proceedings of SPIE, International Society for Optical Engineering, US, vol. 6077, No. 67727, Jan. 18, 2006, XP002538136, 8 pages.
Extended European Search Report, dated Jun. 12, 2014, issued by the European Patent Office, in counterpart Application No. 12734382.0.
Davies, et al., "Samsung and BBC response to Call for Proposals on Video Compression Technology", JCT-VC Meeting, Apr. 15-23, 2010, Dresden, XP030007576, 36 pages.
Communication dated Nov. 12, 2015 from the Intellectual Property Office of the P.R. China issued in corresponding application No. 201280005384.5.
Ken McCann et al. "Samsung Response to the call for proposals on video compression technology" Apr. 2010; 42 pages total.
"Test Model Under Consideration", Joint Collaborative Team on Video Coding (JCT-VC) of ITU-T SG16 WP3 and ISO/IEC JTC1/SC29/WG11, 2nd Meeting: Geneva, CH, Jul. 21-28, 2010, Document: JCTVC-B205, pp. 1-152.
Han, et al., "Improved Video Compression Efficiency Through Flexible Unit Representation and Corresponding Extension of Coding Tools", IEEE Transactions on Circuits and Systems for Video Technology, IEEE Service Center, Piscataway, NJ, US, vol. 20, No. 12, Dec. 2010, XP011329409, 12 pages.
"Test Model Under Consideration", Joint Collaborative Team on Video Coding (JCT-VC) of ITU-T SG16 WP3 adn ISO/IEC JTC1/SC29/WG11, 2nd Meeting: Geneva, CH, Jul. 21-28, 2010, Document: JCTVC-B205, pp. 1-33.
Chinese Office Action for CN Application No. 201810101737.0 dated Mar. 29, 2021 with English Translation.
Extended European Search Report for EP Application No. 21197304.5 dated Jan. 12, 2022.

| seq_parameter_set_rbsp( ) { | C | Descriptor |
|---|---|---|
| ... | | |
|    num_successive_largest_coding_unit | 0 | ue(v) |
|    max_num_motion_vector | 0 | ue(v) |
| ... | | |
| } | | |

FIG. 7

| | C | Descriptor |
|---|---|---|
| prediction_unit( x0,y0, currPredUnitSize ) { | | |
|   if( slice_type != I ) | | |
|     skip_flag | 2 | u(1) \| ae(1) |
|   if( skip_flag ){ | | |
|     ... | | |
|   } | | |
|   else { | | |
|     if( slice_type != I ) | | |
|       pred_mode | 2 | u(1) \| ae(1) |
|     if( PredMode == MODE_INTRA ) { | | |
|       ... | | |
|     } | | |
|     else if( PredMode == MODE_INTER ) { | | |
|       if( maxNumMV - currNumMV >= 2 ) | | |
|         inter_partitioning_idc | 2 | ue(v) \| ae(v) |
|       ... | | |
|     } | | |
|     else if( PredMode == MODE_DIRECT ) { | | |
|       ... | | |
|     } | | |
|   } | | |

FIG. 10

| pic_parameter_set_rbsp( ) { | C | Descriptor |
|---|---|---|
| ... | | |
|    num_successive_largest_coding_unit | 0 | ue(v) |
|    max_num_motion_vector | 0 | ue(v) |
| ... | | |
| } | | |

FIG. 11

| slice_header( ) { | C | Descriptor |
|---|---|---|
| ... | | |
|    num_successive_largest_coding_unit | 0 | ue(v) |
|    max_num_motion_vector | 0 | ue(v) |
| ... | | |
| } | | |

(a) Intra_16x16  (b) PREDICTION DIRECTION

FIG. 22

|   |   |   |   |   |
|---|---|---|---|---|
| A | $e_1$ | b |   | A |
| $e_1$ | $e_3$ | $e_2$ |   |   |
| c | $e_2$ | d |   | c |
|   |   |   |   |   |
| A |   | b |   | A |

FIG. 24
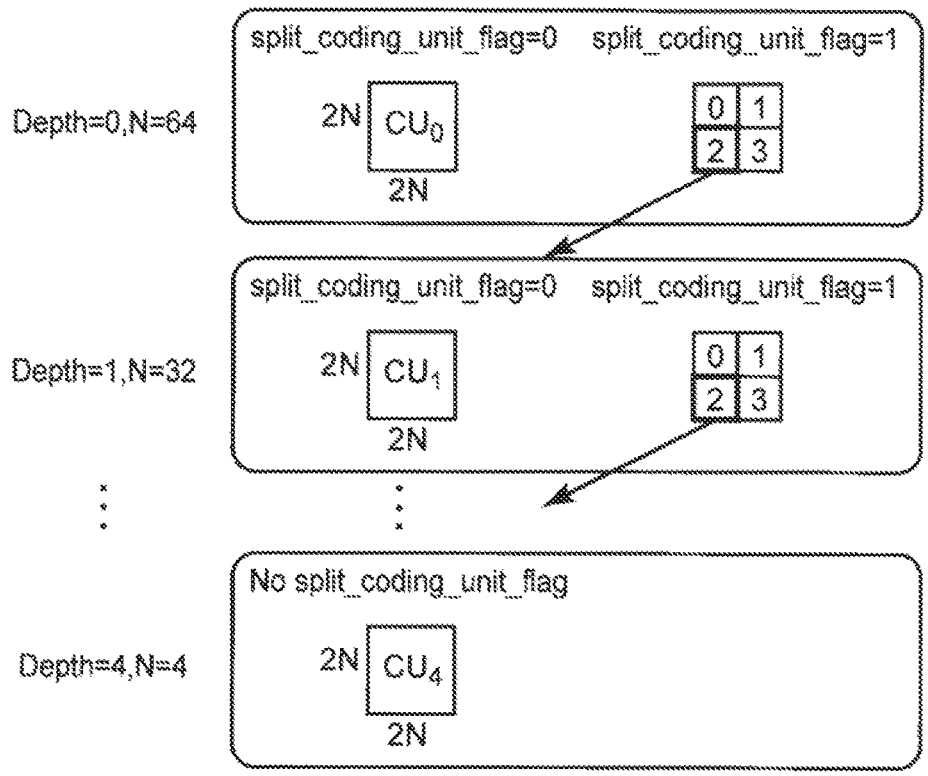
FIG. 25
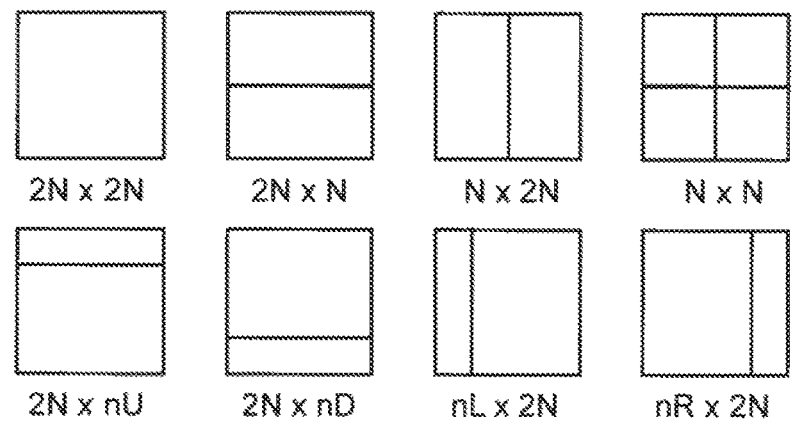
FIG. 26
| A (0) | b (1/4) | c (1/2) | d (3/4) | E (1) |

FIG. 28
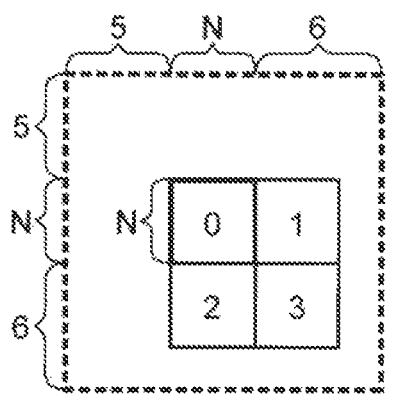 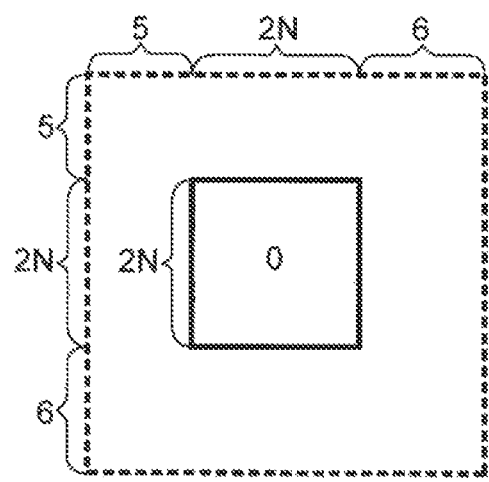
(A) (B)

VIDEO ENCODING DEVICE, VIDEO DECODING DEVICE, VIDEO ENCODING METHOD, VIDEO DECODING METHOD, AND PROGRAM USING INTER PREDICTION

CROSS-REFERENCE TO RELATED PATENT APPLICATIONS

The present application is a continuation application of U.S. patent application Ser. No. 17/060,828 filed on Oct. 1, 2020, which is continuation application of U.S. application Ser. No. 13/977,756 filed on Aug. 14, 2013, which issued as U.S. Pat. No. 10,841,588, which is a National Stage of International Application No. PCT/JP2012/000045 filed on Jan. 5, 2012, claiming priority based on Japanese Patent Application No. 2011-004963, filed on Jan. 13, 2011, the contents of all of which are incorporated herein by reference in their entirety.

TECHNICAL FIELD

The present invention relates to a video encoding device, a video decoding device, a video encoding method, a video decoding method, and a program that use hierarchical coding units.

BACKGROUND ART

Non Patent Literature (NPL) 1 discloses typical video encoding system and video decoding system.

A video encoding device described in NPL 1 has a structure as shown in FIG. 17. The video encoding device shown in FIG. 17 is called a typical video encoding device below.

Referring to FIG. 17, the structure and operation of the typical video encoding device that receives each frame of digitized video as input and outputs a bitstream are described below.

The video encoding device shown in FIG. 17 includes a transformer/quantizer 101, an entropy encoder 102, an inverse transformer/inverse quantizer 103, a buffer 104, a predictor 105, a multiplexer 106, and an encoding controller 108.

The video encoding device shown in FIG. 17 divides each frame into blocks of 16×16 pixel size called macro blocks (MBs), and encodes each MB sequentially from top left of the frame.

FIG. 18 is an explanatory diagram showing an example of block division in the case where the frame has a spatial resolution of QCIF (Quarter Common Intermediate Format). The following describes the operation of each unit while focusing only on pixel values of luminance for simplicity's sake.

A prediction signal supplied from the predictor 105 is subtracted from the block-divided input video, and the result is input to the transformer/quantizer 101 as a prediction error image. There are two types of prediction signals, namely, an intra prediction signal and an inter prediction signal. The inter prediction signal is also called an inter-frame prediction signal.

Each of the prediction signals is described below. The intra prediction signal is a prediction signal generated based on an image of a reconstructed picture that has the same display time as a current picture stored in the buffer 104.

Referring to 8.3.1 Intra_4×4 prediction process for luma samples, 8.3.2 Intra_8×8 prediction process for luma samples, and 8.3.3 Intra_16×16 prediction process for luma samples in NPL 1, intra prediction of three block sizes, i.e. Intra_4×4, Intra_8×8, and Intra_16×16, are available.

Intra_4×4 and Intra_8×8 are respectively intra prediction of 4×4 block size and 8×8 block size, as can be understood from (a) and (c) in FIG. 19. Each circle (○) in the drawing represents a reference pixel used for intra prediction, i.e., a pixel of the reconstructed picture having the same display time as the current picture.

In intra prediction of Intra_4×4, reconstructed peripheral pixels are directly set as reference pixels, and used for padding (extrapolation) in nine directions shown in (b) of FIG. 19 to form the prediction signal. In intra prediction of Intra_8×8, pixels obtained by smoothing peripheral pixels of the image of the reconstructed picture by low-pass filters (½, ¼, ½) shown under the right arrow in (c) of FIG. 19 are set as reference pixels, and used for extrapolation in the nine directions shown in (b) of FIG. 19 to form the prediction signal.

Similarly, Intra_16×16 is intra prediction of 16×16 block size, as can be understood from (a) in FIG. 20. Like in FIG. 19, each circle (0) in the drawing represents a reference pixel used for intra prediction, i.e., a pixel of the reconstructed picture having the same display time as the current picture. In intra prediction of Intra_16×16, peripheral pixels of the image of the reconstructed picture are directly set as reference pixels, and used for extrapolation in four directions shown in (b) of FIG. 20 to form the prediction signal.

Hereafter, an MB and a block encoded using the intra prediction signal are called an intra MB and an intra block, respectively, i.e., a block size of intra prediction is called an intra prediction block size, and a direction of extrapolation is called an intra prediction direction. The intra prediction block size and the intra prediction direction are prediction parameters related to intra prediction.

The inter prediction signal is a prediction signal generated from an image of a reconstructed picture different in display time from the one the current picture has and is stored in the buffer 104. Hereafter, an MB and a block encoded using the inter prediction signal are called an inter MB and an inter block, respectively. A block size of inter prediction (inter prediction block size) can be selected from, for example, 16×16, 16×8, 8×16, 8×8, 8×4, 4×8, and 4×4.

FIG. 21 is an explanatory diagram showing an example of inter prediction using 16×16 block size as an example. A motion vector $MV=(mv_x, mv_y)$ shown in FIG. 21 is a prediction, which indicates the amount of parallel translation of an inter prediction block (inter prediction signal) of a reference picture relative to a block to be encoded. In AVC, prediction parameters of inter prediction include not only a direction of inter prediction representing a direction of the reference picture of an inter prediction signal relative to a picture to be encoded of the block to be encoded, but also a reference picture index for identifying the reference picture used for inter prediction of the block to be encoded. This is because, in AVC, multiple reference pictures stored in the buffer 104 can be used for inter prediction.

In AVC inter prediction, a motion vector can be calculated at ¼-pixel accuracy. FIG. 22 is an explanatory diagram showing interpolation processing for luminance signals in motion-compensated prediction. In FIG. 22, A represents a pixel signal at an integer pixel position, b, c, d represent pixel signals at decimal pixel positions with ½-pixel accuracy, and $e_1$, $e_2$, $e_3$ represent pixel signals at decimal pixel positions with ¼-pixel accuracy. The pixel signal b is generated by applying a six-tap filter to pixels at horizontal integer pixel positions. Likewise, the pixel signal c is generated by applying the six-tap filter to pixels at vertical integer pixel positions. The pixel signal d is generated by applying the six-tap filter to pixels at horizontal or vertical decimal pixel positions with ½-pixel accuracy. The coefficients of the six-tap filter are represented as [1, −5, 20, 20, −5, 1]/32. The pixel signals $e_1$, $e_2$, and $e_3$ are generated by applying a two-tap filter [1, 1]/2 to pixels at neighboring integer pixel positions or decimal pixel positions, respectively.

A picture encoded by including only intra MBs is called an I picture. A picture encoded by including not only intra MBs but also inter MBs is called a P picture. A picture encoded by including inter MBs that use not only one reference picture but two reference pictures simultaneously for inter prediction is called a B picture. In the B picture, inter prediction in which the direction of the reference picture of the inter prediction signal relative to the picture to be encoded of the block to be encoded is past is called forward prediction, inter prediction in which the direction of the reference picture of the inter prediction signal relative to the picture to be encoded of the block to be encoded is future is called backward prediction, and inter prediction simultaneously using two reference pictures involving both the past and the future is called bidirectional prediction. The direction of inter prediction (inter prediction direction) is a prediction parameter of inter prediction.

In accordance with an instruction from the encoding controller 108, the predictor 105 compares an input video signal with a prediction signal to determine a prediction parameter that minimizes the energy of a prediction error image block. The encoding controller 108 supplies the determined prediction parameter to the entropy encoder 102.

The transformer/quantizer 101 frequency-transforms the prediction error image to get a frequency transform coefficient.

The transformer/quantizer 101 further quantizes the frequency transform coefficient with a predetermined quantization step width Qs. Hereafter, the quantized frequency transform coefficient is called a transform quantization value.

The entropy encoder 102 entropy-encodes the prediction parameters and the transform quantization value. The prediction parameters are information associated with MB and block prediction, such as prediction mode (intra prediction, inter prediction), intra prediction block size, intra prediction direction, inter prediction block size, and motion vector mentioned above.

The inverse transformer/inverse quantizer 103 inverse-quantizes the transform quantization value with the predetermined quantization step width Qs. The inverse transformer/inverse quantizer 103 further performs inverse frequency transform of the frequency transform coefficient obtained by the inverse quantization. The prediction signal is added to the reconstructed prediction error image obtained by the inverse frequency transform, and the result is supplied to the buffer 104.

The buffer 104 stores the reconstructed image supplied. The reconstructed image for one frame is called a reconstructed picture.

The multiplexer 106 multiplexes and outputs the output data of the entropy encoder 102 and coding parameters.

Based on the operation described above, the multiplexer 106 in the video encoding device generates a bitstream.

A video decoding device described in NPL 1 has a structure as shown in FIG. 23. Hereafter, the video decoding device shown in FIG. 23 is called a typical video decoding device.

Referring to FIG. 23, the structure and operation of the typical video decoding device that receives the bitstream as input and outputs a decoded video frame is described.

The video decoding device shown in FIG. 23 includes a de-multiplexer 201, an entropy decoder 202, an inverse transformer/inverse quantizer 203, a predictor 204, and a buffer 205.

The de-multiplexer 201 de-multiplexes the input bitstream and extracts an entropy-encoded video bitstream.

The entropy decoder 202 entropy-decodes the video bitstream. The entropy decoder 202 entropy-decodes the MB and block prediction parameters and the transform quantization value, and supplies the results to the inverse transformer/inverse quantizer 203 and the predictor 204.

The inverse transformer/inverse quantizer 203 inverse-quantizes the transform quantization value with the quantization step width. The inverse transformer/inverse quantizer 203 further performs inverse frequency transform of the frequency transform coefficient obtained by the inverse quantization.

After the inverse frequency transform, the predictor 204 generates a prediction signal using an image of a reconstructed picture stored in the buffer 205 based on the entropy-decoded MB and block prediction parameters.

After the generation of the prediction signal, the prediction signal supplied from the predictor 204 is added to a reconstructed prediction error image obtained by the inverse frequency transform performed by the inverse transformer/inverse quantizer 203, and the result is supplied to the buffer 205 as a reconstructed image.

Then, the reconstructed picture stored in the buffer 205 is output as a decoded image (decoded video).

Based on the operation described above, the typical video decoding device generates the decoded image.

CITATION LIST

Non Patent Literatures

NPL 1: ISO/IEC 14496-10 Advanced Video Coding
NPL 2: "Test Model under Consideration," Document: JCTVC-B205, Joint Collaborative Team on Video Coding (JCT-VC) of ITU-T SG16 WP3 and ISO/IEC JTC1/SC29/WG11 2nd Meeting: Geneva, CH, 21-28 Jul. 2010

SUMMARY OF INVENTION

Technical Problem

NPL 2 discloses Test Model under Consideration (TMuC). Unlike that disclosed in NPL 1, the TMuC scheme uses hierarchical coding units (Coding Tree Blocks (CTBs)) shown in FIG. 24. In this specification, CTB blocks are called Coding Units (CUs).

Here, the largest CU is called the Largest Coding Unit (LCU), and the smallest CU is called the Smallest Coding Unit (SCU). In the TMuC scheme, the concept of Prediction Unit (PU) is introduced as a unit of prediction for each CU (see FIG. 25). The PU is a basic unit of prediction, and eight PU partition types {2N×2N, 2N×N, N×2N, N×N, 2N×nU, 2N×nD, nL×2N, nR×2N} shown in FIG. 25 are defined. The PU used for inter prediction is called an inter PU and the PU used for intra prediction is called intra PU. The PU partition for which inter prediction is used is called inter-PU partition, and the PU partition for which intra prediction is used is called intra-PU partition. Among the shapes shown in FIG. 25, only the squares of 2N×2N and N×N are supported as the intra-PU partitions. Hereafter, the lengths of one side of a CU and a PU are called CU size and PU size, respectively.

The TMuC scheme can use a filter with up to twelve taps to seek for a predicted image with a decimal accuracy. The relationship between pixel position and filter coefficient is as follows.

TABLE 1

| Pixel Position | Filter Coefficient |
|---|---|
| ¼ | {−1, 5, −12, 20, −40, 229, 76, −32, 16, −8, 4, −1} |
| ½ | {−1, 8, −16, 24, −48, 161, 161, −48, 24, −16, 8, −1} |
| ¾ | {−1, 4, −8, 16, −32, 76, 229, −40, 20, −12, 5, −1} |

The pixel position is described with reference to FIG. 26. In FIG. 26, it is assumed that A and E are pixels at integer pixel positions. In this case, b is a pixel at ¼-pixel position, c is a pixel at ½-pixel position, and d is a pixel at ¾ pixel position. The same applies to those in the vertical direction.

The pixel b or pixel c shown in FIG. 22 is generated by applying a filter for horizontal or vertical ½-pixel position once. The pixel $e_1$ is generated by applying a filter for ¼-pixel position once.

Referring to FIG. 27, a description is made of an example of generation of decimal pixels, such as pixel $e_2$ and pixel $e_3$, the pixel positions of which are decimal-accuracy positions in both the horizontal and vertical directions and at least either of which is ¼-pixel position. In FIG. 27, it is assumed that pixel A is a pixel at an integer pixel position and pixel c is a pixel at a decimal pixel position to be obtained. In this case, pixel b is first generated by applying a filter for vertical ¼-pixel position. Then, pixel c is generated by applying a filter for horizontal ¾ pixel position to the decimal pixel b. In 8.3 Interpolation Methods of NPL 2, the generation of decimal pixels is described in more detail.

In the TMuC scheme, a syntax indicative of a PU partition type in each PU header of CUs on all the levels (according to 4.1.10 Prediction unit syntax in NPL 2, intra_split_flag in the case of intra prediction and inter_partitioning_idc in the case of inter prediction) is embedded in an output bitstream. Hereafter, intra_split_flag syntax is called an intra-PU partition type syntax, and inter_partitioning_idc syntax is called an inter-PU partition type syntax.

When many small-size CUs exist within each LCU, the ratio of the number of bits of the inter-PU partition type syntax included in the bitstream increases, causing a problem that the quality of compressed video is reduced.

Further, in the TMuC scheme, memory accesses to reference pictures increase as the size of the inter-PU partition becomes smaller, causing a problem of straining the memory bandwidth. Particularly, since the twelve-tap filter is used to generate a decimal pixel in the TMuC scheme, the memory bandwidth is more strained.

FIG. 28 is an explanatory diagram for describing memory access areas when the twelve-tap filter is used. FIG. 28(A) shows a memory access area of one inter-PU partition when the PU partition type of N×N is selected, and FIG. 28(B) shows a memory access area when the inter-PU partition type of 2N×2N is selected.

When N×N is selected, since memory access of a size surrounded by the broken line in FIG. 28(A) is performed four times in total for each of inter-PU partitions 0, 1, 2, 3, the amount of memory access has a value obtained by multiplying $4(N+11)^2=4N^2+88N+484$ by the bit count of a reference picture. Since the amount of memory access of the 2N×2N inter-PU partition has a value obtained by multiplying $(2N+11)^2=4N^2+44N+121$ by the bit count of the reference picture, the amount of memory access of the N×N inter-PU partition becomes greater than the amount of memory access of 2N×2N.

For example, the amount of memory access of inter PUs in an 8×8 CU when N=4, the prediction is one-way prediction, and the bit accuracy of each pixel value is 8 bits is considered. The amount of memory access in the 2N×2N inter-PU partition is 19×19×1×8 bits=2888 bits, while the amount of memory access in the N×N inter-PU partition is 5×15×4×8 bits=7200 bits, whose amount of memory access is about 2.5 times.

In units of LCU, if the block size of LCU is 128×128, the amount of memory access when the LCU is predicted by one inter-PU partition will be 139×139×1×8 bits=154568 bits, while the amount of memory access when the LCU is all predicted by 4×4 inter-PU partitions (i.e., when the LCU is predicted by 1024 inter-PU partitions) will be 15×15× 1024×8 bits=1843200 bits, whose amount of memory access is about twelve times.

It is an object of the present invention to reduce the memory bandwidth per predetermined area.

Solution to Problem

A video encoding device according to the present invention is a video encoding device for encoding video using inter prediction, which includes encoding control means for controlling an inter-PU partition type of a CU to be encoded, based on the maximum number of motion vectors allowed for an image block having a predetermined area and the number of motion vectors of an encoded image block contained in the image block having the predetermined area.

A video decoding device according to the present invention is a video decoding device for decoding video using inter prediction, which includes decoding control means for controlling an inter-PU partition type of a CU to be decoded, based on the maximum number of motion vectors allowed for an image block having a predetermined area and the number of motion vectors of a decoded image block contained in the image block having the predetermined area.

A video encoding method according to the present invention is a video encoding method for encoding video using inter prediction, which includes controlling an inter-PU partition type of a CU to be encoded, based on the maximum number of motion vectors allowed for an image block having a predetermined area and the number of motion vectors of an encoded image block contained in the image block having the predetermined area.

A video decoding method according to the present invention is a video decoding method for decoding video using inter prediction, which includes controlling an inter-PU partition type of a CU to be decoded, based on the maximum number of motion vectors allowed for an image block having a predetermined area and the number of motion vectors of a decoded image block contained in the image block having the predetermined area.

A video encoding program according to the present invention causes a computer for encoding video using inter prediction to execute a process of controlling an inter-PU partition type of a CU to be encoded, based on the maximum number of motion vectors allowed for an image block having a predetermined area and the number of motion vectors of an encoded image block contained in the image block having the predetermined area.

A video decoding program according to the present invention causes a computer for decoding video using inter prediction to execute a process of controlling an inter-PU partition type of a CU to be decoded, based on the maximum number of motion vectors allowed for an image block having a predetermined area and the number of motion vectors of a decoded image block contained in the image block having the predetermined area.

Advantageous Effects of Invention

According to the present invention, since available inter-PU partitions are restricted based on the number of motion vectors of an encoded image block contained in an image block having a predetermined area, the memory bandwidth per predetermined area can be reduced.

Further, since the inter prediction direction is restricted based on the number of motion vectors of an encoded image block contained in an image block having a predetermined area, the memory bandwidth per predetermined area can be reduced.

BRIEF DESCRIPTION OF DRAWINGS

FIG. 7 is an explanatory diagram of a list indicative of information on inter_partitioning_idc syntax in a PU syntax.

FIG. 10 is an explanatory diagram of a list indicative of information on a predetermined area and information on the maximum number of motion vectors allowed for an image block having the predetermined area in a picture parameter set.

FIG. 11 is an explanatory diagram of a list indicative of information on a predetermined area and information on the number of motion vectors allowed for an image block having the predetermined area in a slice header.

Figure 22:
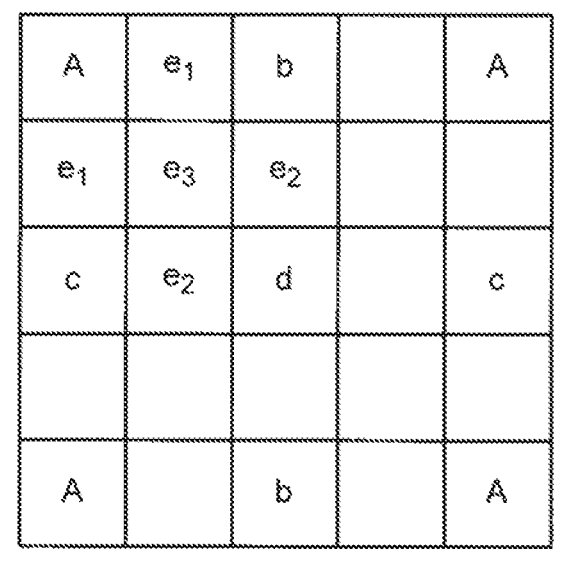

FIG. 22 is an explanatory diagram showing interpolation processing for luminance signals in motion-compensated prediction.

FIG. 24 is an explanatory diagram for describing a CTB.

FIG. 25 is an explanatory diagram for describing a PU.

FIG. 26 is an explanatory diagram for describing decimal pixel positions.

FIG. 28 is an explanatory diagram for describing a memory access range when a decimal pixel is generated using a twelve-tap filter in the TMuC scheme.

DESCRIPTION OF EMBODIMENTS

In order to solve the technical problems of the above-mentioned typical techniques, the present invention restricts inter-PU partitions of a CU to be encoded and an inter prediction direction based on the number of motion vectors of an encoded image block contained in an image block having a predetermined area to solve the problems. In an example of the present invention, inter-PU partition type candidates and inter prediction direction candidates are respectively restricted based on the number of motion vectors of an encoded image block contained in an image block having a predetermined area to solve the problems. In another example of the present invention, transmission of an inter-PU partition type syntax in a PU header is restricted to solve the problems. In the above example of the present invention, the ratio of the number of bits of the inter-PU partition type syntax included in a bitstream can be kept low to suppress the memory bandwidth while improving the quality of compressed video.

In this specification, for example, the predetermined area means one LCU or successive two or more LCUs.

Exemplary Embodiment 1

Exemplary Embodiment 1 shows a video encoding device including: encoding control means for controlling an inter-PU partition type and an inter prediction direction based on the maximum number of motion vectors allowed for an image block having a predetermined area (a predetermined region in the image) and the number of motion vectors of an encoded image block contained in the image block having the predetermined area; and means for embedding, in a bitstream, information on the predetermined area and information on the maximum number of motion vectors allowed for the image block having the predetermined area to signal, to a video decoding device, the information on the maximum number of motion vectors allowed for the image block having the predetermined area.

In this exemplary embodiment, it is assumed that the predetermined area is LCUs of successive numSucLcu (one or more LCUs), the maximum number of motion vectors allowed per predetermined area is maxNumMV, and the number of motion vectors contained in an encoded CU within the predetermined area is currNumMV.

Figure 1:
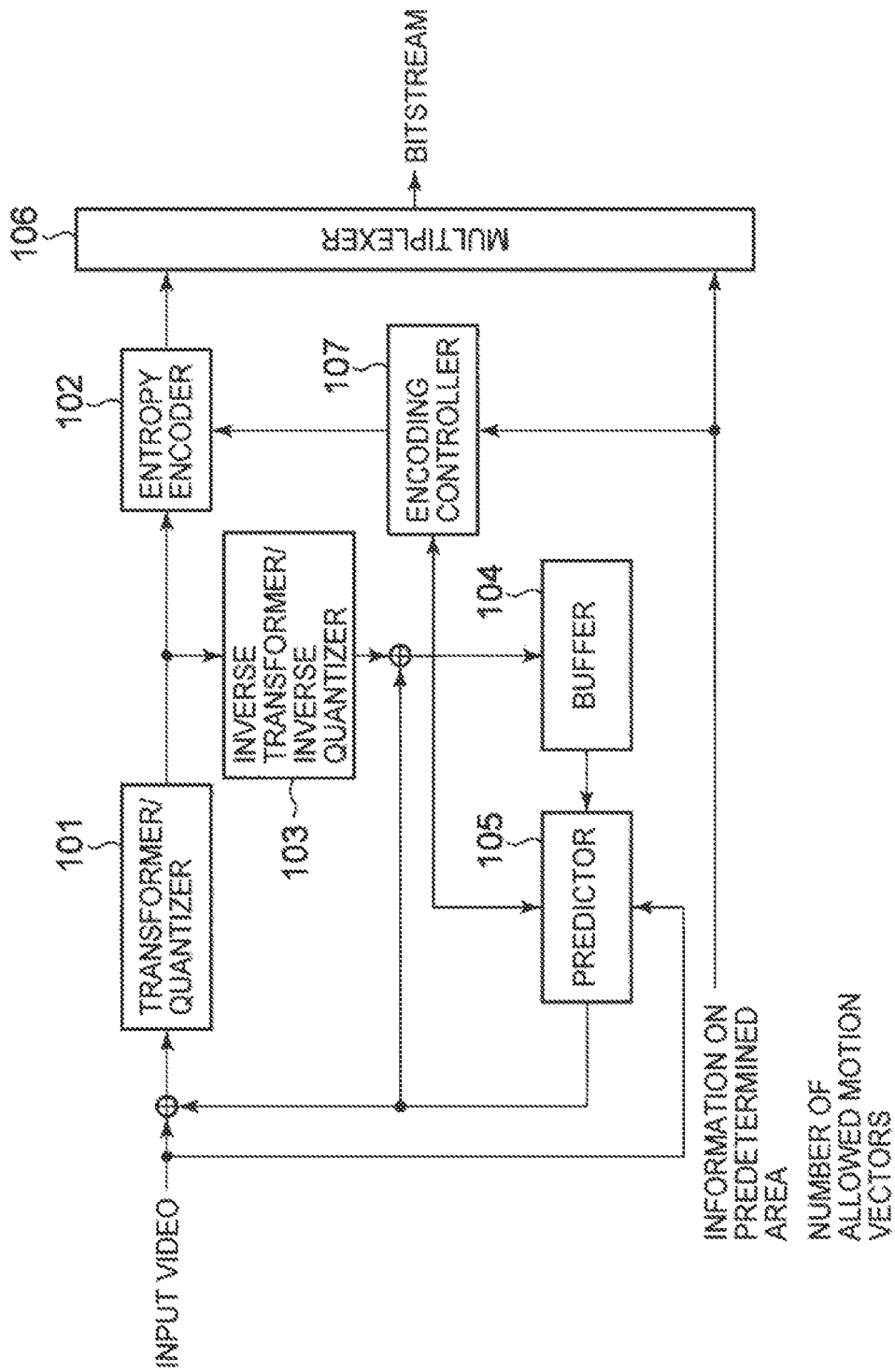
FIG. 1 is a block diagram of a video encoding device in Exemplary Embodiment 1.
Figure 17:
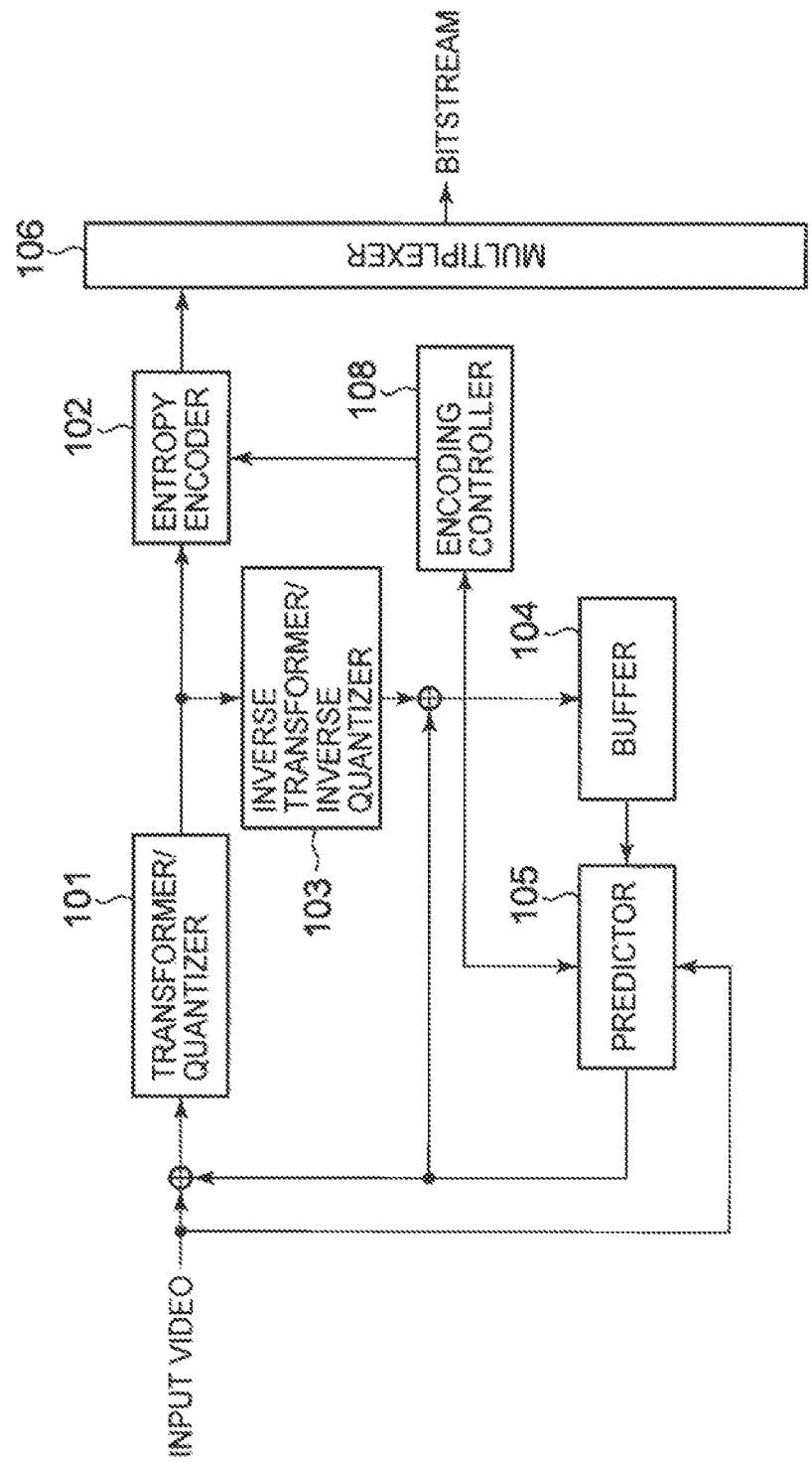
FIG. 17 is a block diagram of a typical video encoding device.
Figure 18:
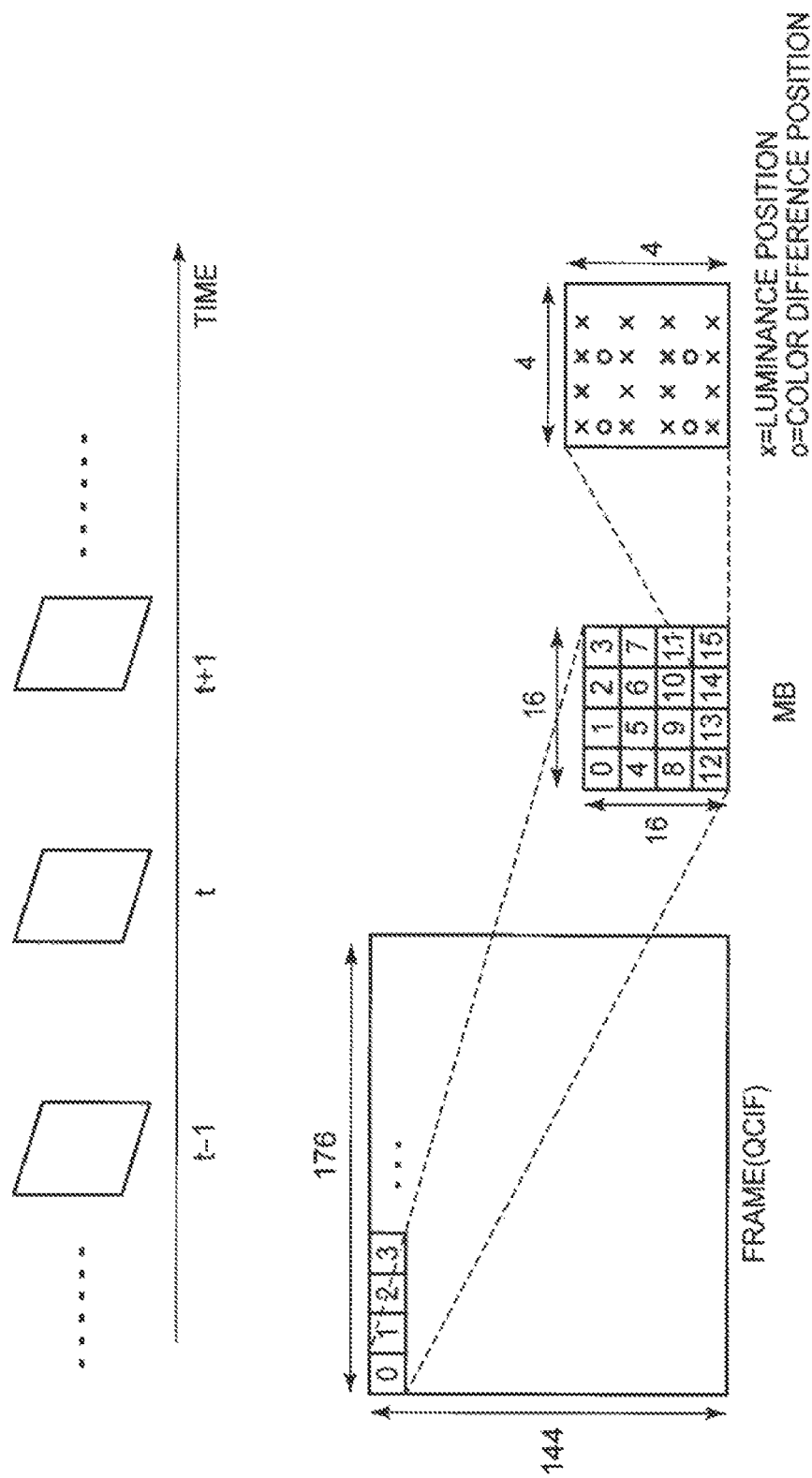
FIG. 18 is an explanatory diagram showing an example of block division.
Figure 19:
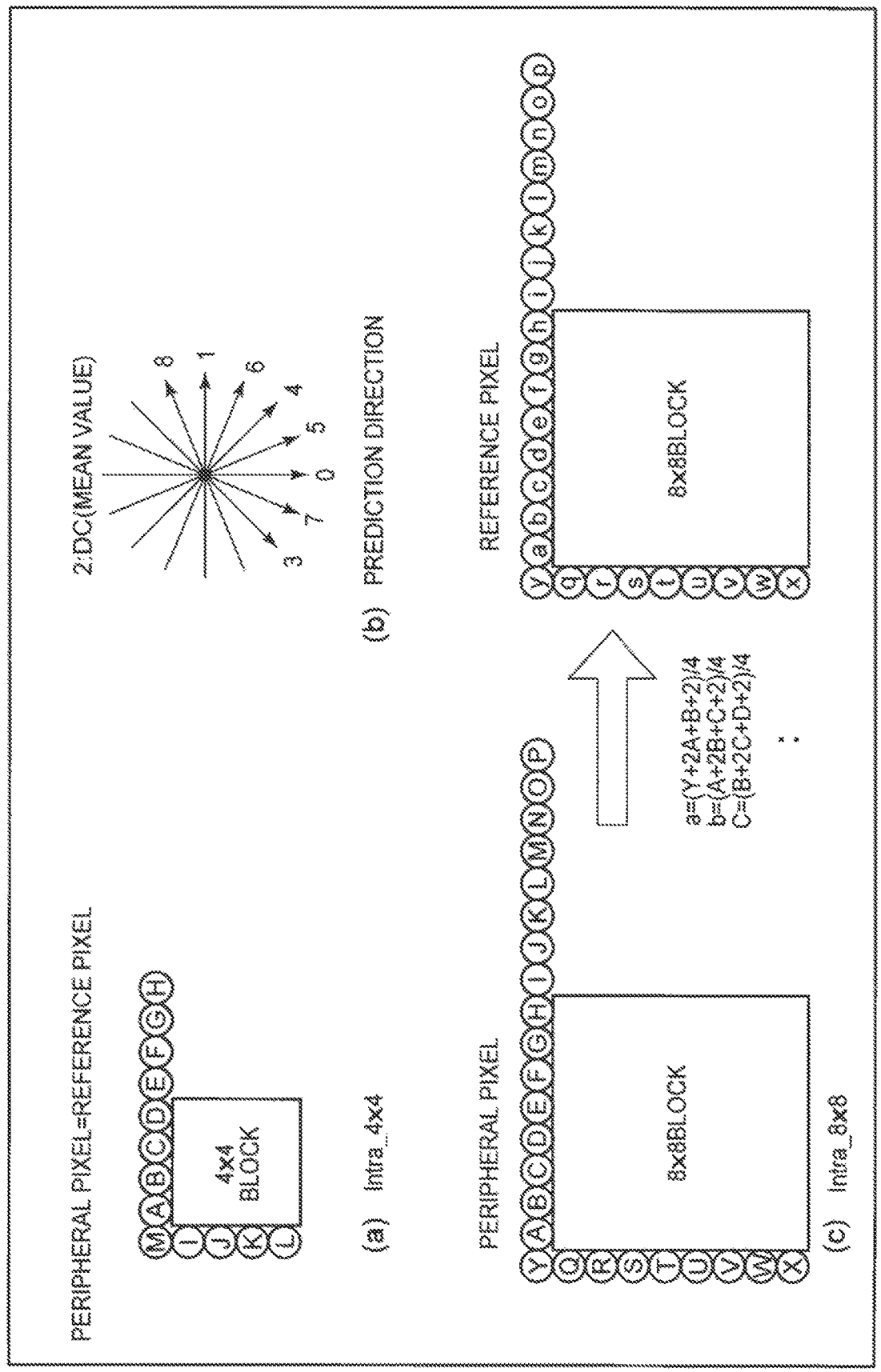
FIG. 19 is an explanatory diagram for describing intra prediction of Intra_4×4 and Intra_8×8.
Figure 20:
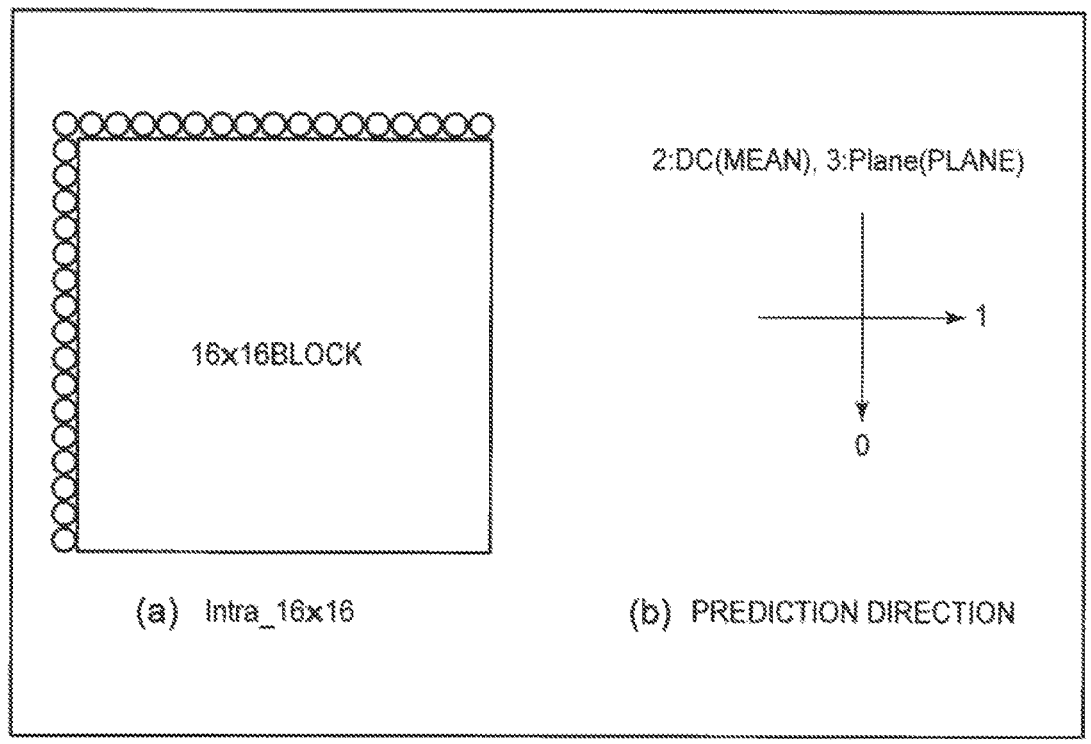
FIG. 20 is an explanatory diagram for describing intra prediction of Intra_16×16.
Figure 21:
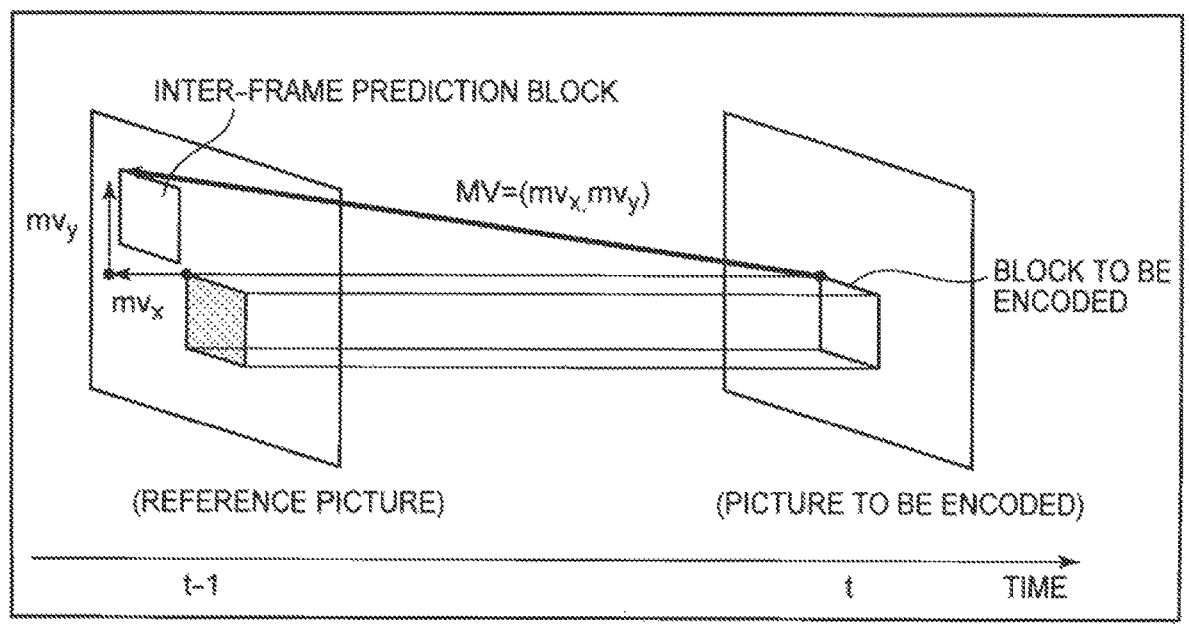
FIG. 21 is an explanatory diagram showing an example of inter prediction.
Figure 23:
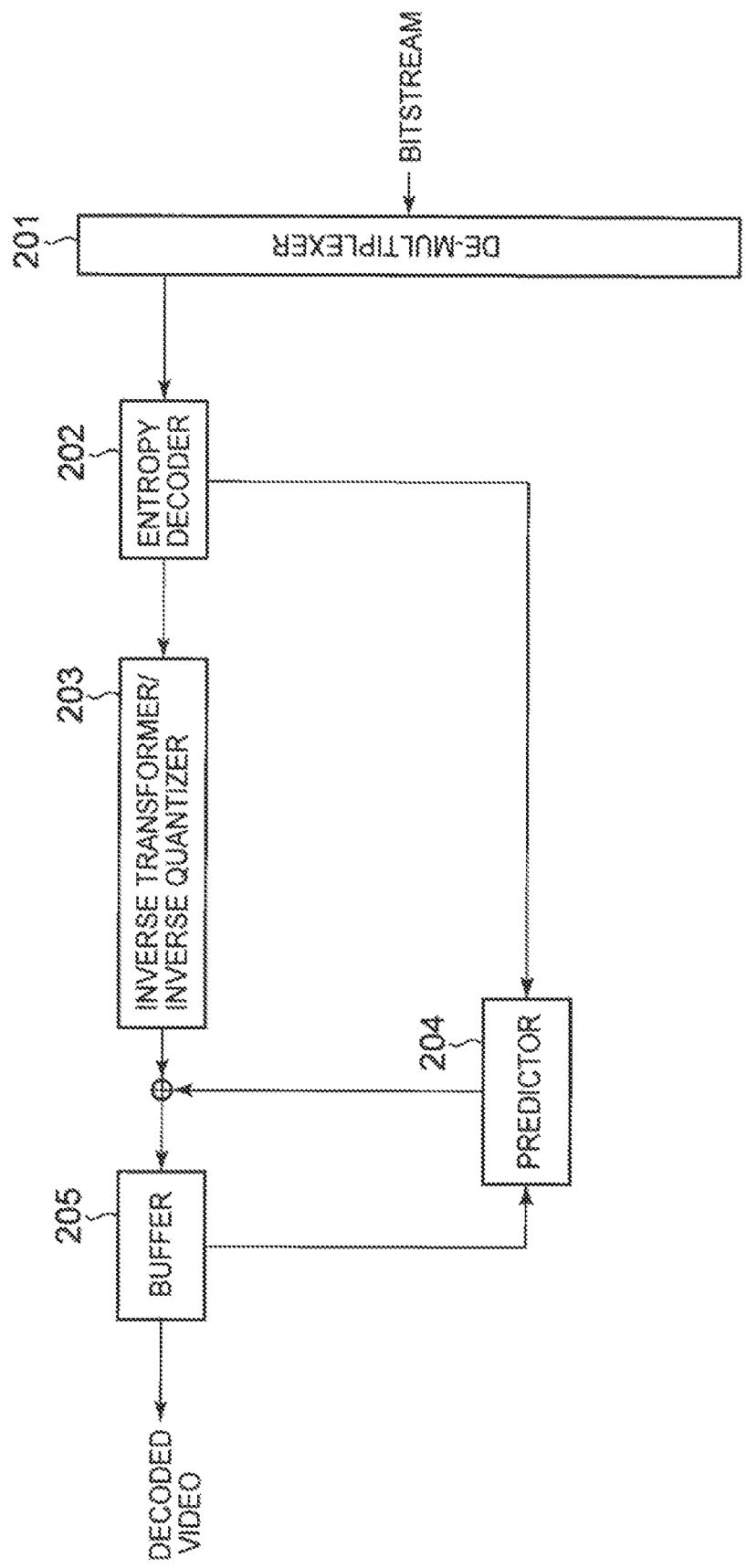
FIG. 23 is a block diagram of a typical video decoding device.
Figure 27:
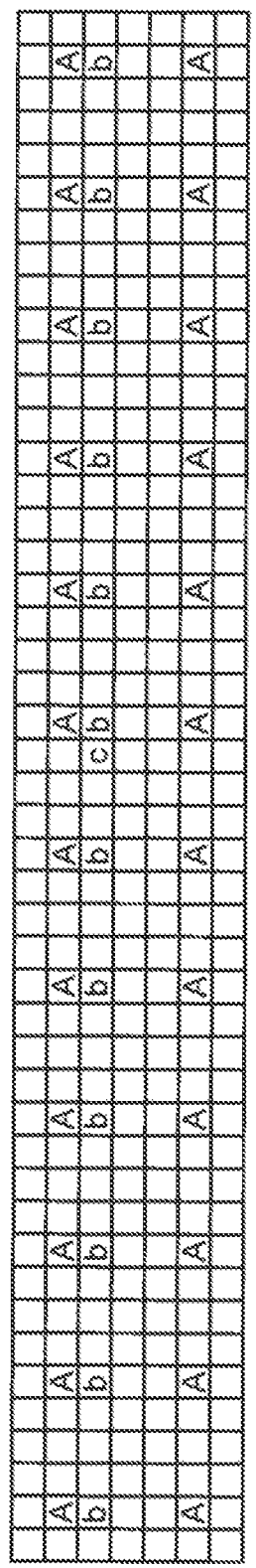
FIG. 27 is an explanatory diagram for describing a decimal pixel generation method using a twelve-tap filter in the TMuC scheme.

As shown in FIG. 1, the video encoding device in the exemplary embodiment includes a transformer/quantizer 101, an entropy encoder 102, an inverse transformer/inverse quantizer 103, a buffer 104, a predictor 105, a multiplexer 106, and an encoding controller 107, like the typical video encoding device shown in FIG. 17.

The video encoding device in the exemplary embodiment shown in FIG. 1 differs from the video encoding device shown in FIG. 17 in that numSucLcu and maxNumMV are supplied to the encoding controller 107 to control the inter-PU partition type and the inter prediction direction based on numSucLcu and maxNumMV. NumSucLcu and maxNumMV are also supplied to the multiplexer 106 to signal numSucLcu and maxNumMV to the video decoding device.

The encoding controller 107 has the predictor 105 calculate a cost (Rate-Distortion cost: R-D cost) calculated from a coding distortion (the energy of an error image between an input signal and a reconstructed picture) and a generated bit count. The encoding controller 107 determines a CU splitting pattern in which the R-D cost is minimized (the splitting pattern determined by split_coding_unit_flag as shown in FIG. 24), and prediction parameters of each CU. The encoding controller 107 supplies determined split_coding_unit_flag and the prediction parameters of each CU to the predictor 105 and the entropy encoder 102. The prediction parameters are information associated with prediction of a CU to be encoded, such as prediction mode (pred_mode), intra-PU partition type (intra_split_flag), intra prediction direction, inter-PU partition type (inter_partitioning_idc), and motion vector.

As an example, the encoding controller 107 in the exemplary embodiment controls the PU partition type based on numSucLcu and maxNumMV. When 4<=maxNumMV−currNumMV, the encoding controller 107 in the exemplary embodiment selects the optimum PU partition type as a prediction parameter from a total of ten types of intra prediction {2N×2N, N×N} and a full set of inter prediction. When 2<=maxNumMV−currNumMV<4, the encoding controller 107 selects the optimum PU partition type as a prediction parameter from a total of nine types of intra prediction {2N×2N, N×N} and inter prediction {2N×2N, 2N×N, N×2N, 2N×nU, 2N×nD, nL×2N, nR×2N}. When 1<=maxNumMV−currNumMV<2, the encoding controller 107 selects the optimum PU partition type as a prediction parameter from a total of three types of intra prediction {2N×2N, N×N} and inter prediction {2N×2N}. When maxNumMV−currNumMV<1, the encoding controller 107 selects the optimum PU partition type as a prediction parameter from two types of intra prediction {2N×2N, N×N}.

The encoding controller 107 in the exemplary embodiment further controls candidates for the inter prediction direction based on maxNumMV and currNumMV. For example, when 2<=maxNumMV−currNumMV, the encoding controller 107 selects an inter prediction direction as a prediction parameter from {forward, backward, bidirectional} for a 2N×2N inter-PU partition to be selected. When 1<=maxNumMV−currNumMV<2, the encoding controller 107 selects an inter prediction direction as a prediction parameter from {forward, backward}. Note that, when maxNumMV−currNumMV<1, the PU partition type to be selected is intra.

Figure 2:
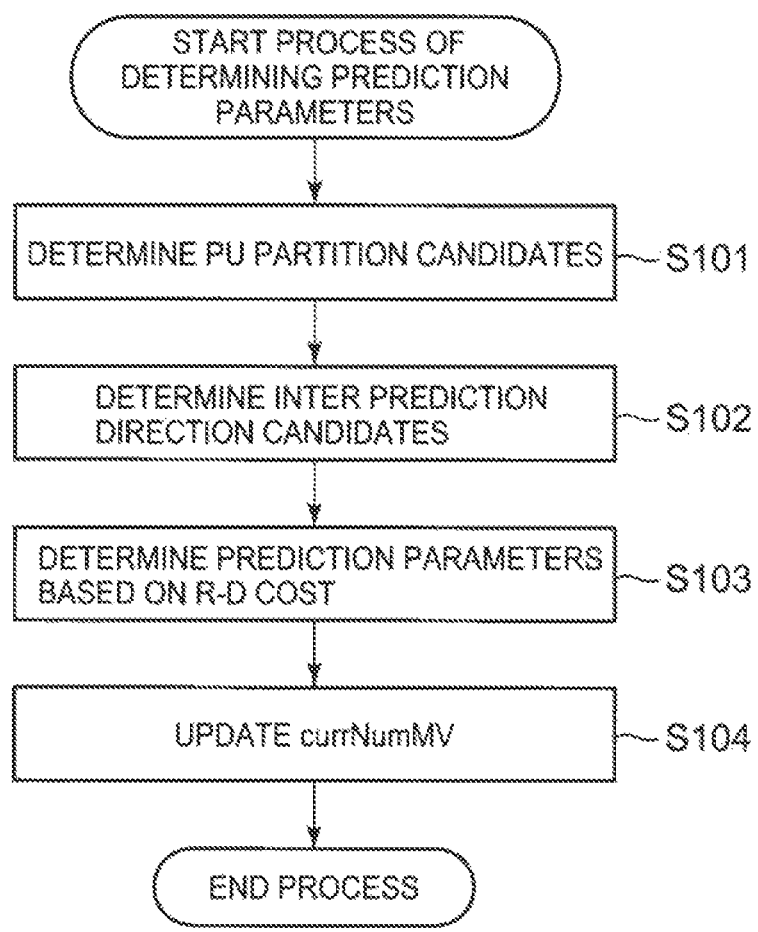
FIG. 2 is a flowchart showing an operation of determining prediction parameters performed by an encoding controller in Exemplary Embodiment 1.

FIG. 2 is a flowchart showing the operation of the encoding controller 107 in the exemplary embodiment to determine prediction parameters for each CU.

As shown in FIG. 2, the encoding controller 107 determines PU partition candidates in step S101. In step S102, the encoding controller 107 determines inter prediction direction candidates. In step S103, the encoding controller 107 uses the PU partition type and inter prediction direction candidates determined in step S101 and step S102 to determine prediction parameters based on the R-D cost. In step S104, the encoding controller 107 updates currNumMV based on the PU partition type and the inter prediction direction determined in step S102 and step S103.

When the inter prediction direction of the PU partition type is bidirectional prediction in step S104, the encoding controller 107 sets currNumMV=currNumMV+2, or otherwise updates currNumMV=currNumMV+1 and currNumMV.

Figure 3:
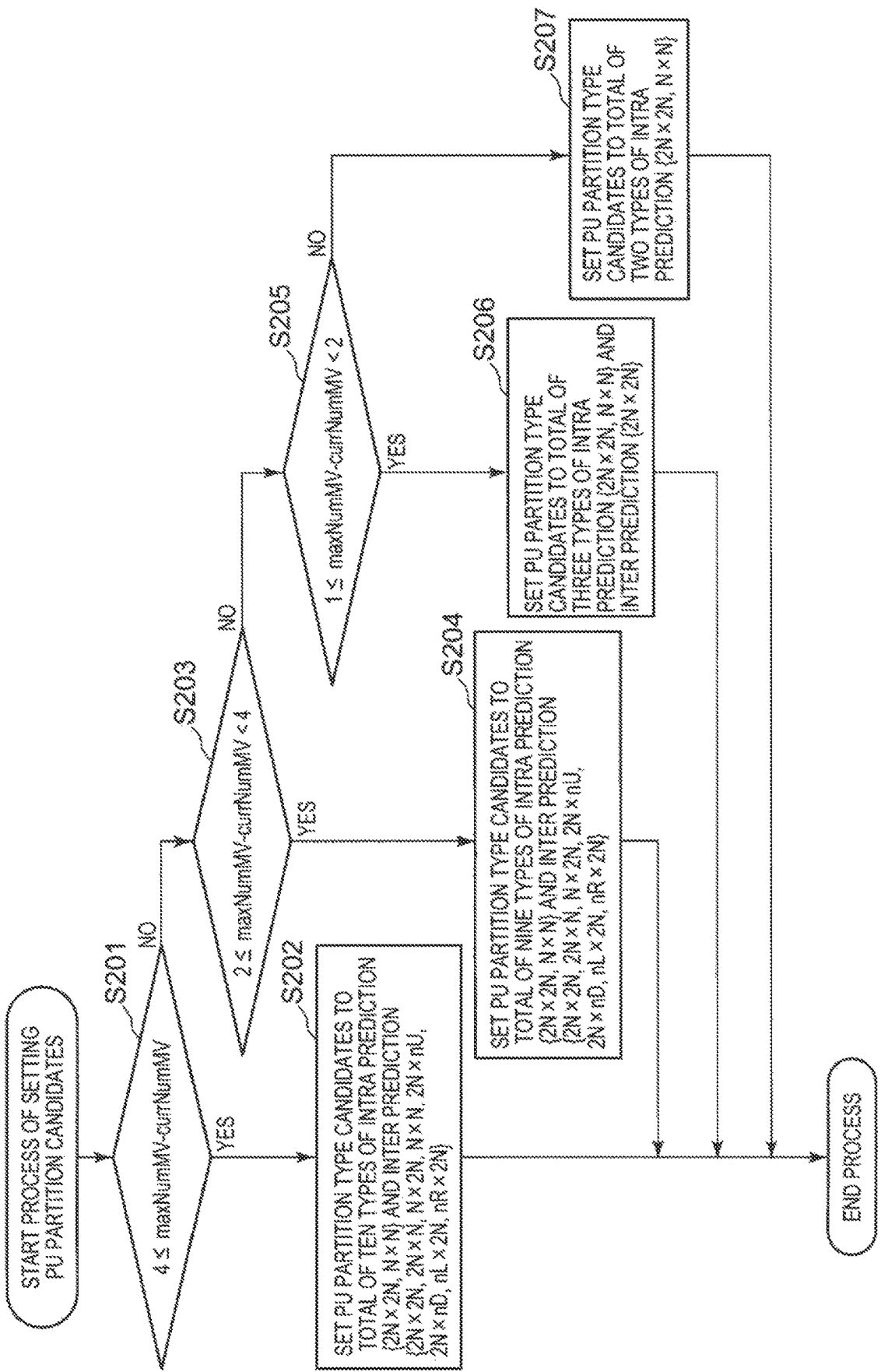
FIG. 3 is a flowchart showing an operation of determining PU partition type candidates.

FIG. 3 is a flowchart showing an operation of determining the PU partition type candidates in step S101 of FIG. 2.

When determining that 4<=maxNumMV−currNumMV in step S201, the encoding controller 107 sets PU partition type candidates in step S202 to a total of ten types of intra prediction {2N×2N, N×N} and a full set of inter prediction.

Otherwise, i.e. when determining that maxNumMV−currNumMV<4 in step S201 and determining that 2<=maxNumMV−currNumMV<4 in step S203, the encoding controller 107 sets PU partition type candidates in step S204 to a total of nine types of intra prediction {2N×2N, N×N} and inter prediction {2N×2N, 2N×N, N×2N, 2N×nU, 2N×nD, nL×2N, nR×2N}.

Otherwise, i.e. when determining that maxNumMV−currNumMV<2 in step S203 and determining that 1<=maxNumMV−currNumMV<2 in step S205, the encoding controller 107 sets PU partition type candidates in step S206 to a total of three types of intra prediction {2N×2N, N×N} and inter prediction {2N×2N}.

Otherwise, i.e. when determining that maxNumMV−currNumMV<1 in step S205, the encoding controller 107 sets PU partition type candidates to two types of intra prediction {2N×2N, N×N}.

Figure 4:
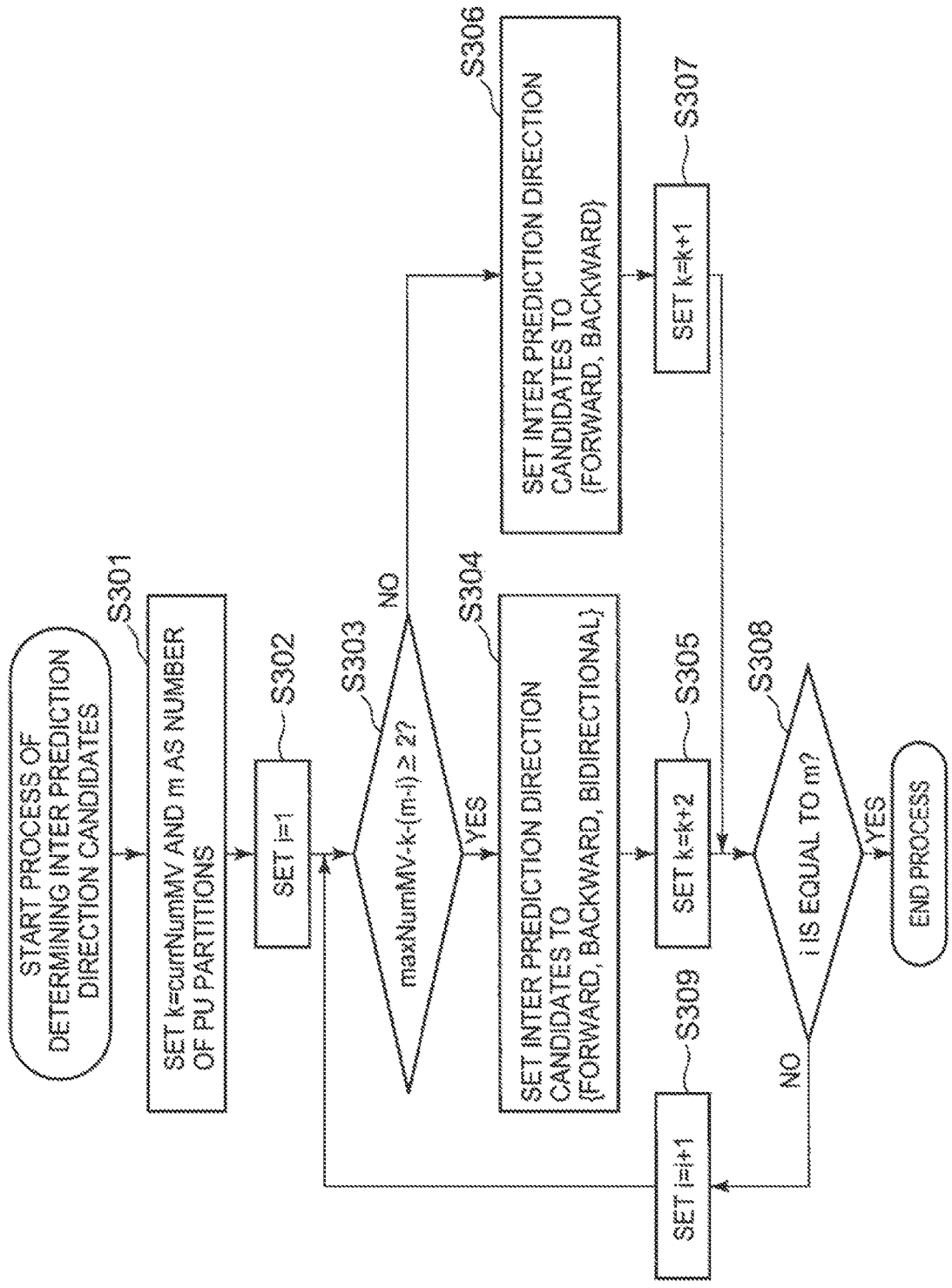
FIG. 4 is a flowchart showing an operation of determining inter prediction direction candidates for each PU partition.

FIG. 4 is a flowchart showing an operation of determining the inter prediction direction candidates in step S102 of FIG. 2. In the following, the index of each PU partition is expressed as i and the number of partitions is expressed as m for illustrative purposes. For example, when the PU partition type is N×N, m=4 and the index i takes on values 1, 2, 3, 4.

In step S301, the encoding controller 107 sets k=currNumMV and m as the number of PU partitions.

In step S302, the encoding controller 107 sets the variable i representing the PU partition index to 1.

In step S303, when determining that maxNumMV−k−(m−i)>=2, the encoding controller 107 sets, in step S304, inter prediction direction candidates for partition i to {forward, backward, bidirectional}, and sets k=k+2 in step S305.

Otherwise, i.e. when determining that maxNumMV−k−(m−i)≤1 in step S303, the encoding controller 107 sets, in S306, the inter prediction direction candidates for partition i to {forward, backward}. In step S307, the encoding controller 107 sets k=k+1.

When i is equal to m in step S308, the process is ended.

Otherwise, the encoding controller 107 sets i=i+1 in step S309 and returns to step S303.

The predictor 105 selects a prediction signal corresponding to the prediction parameters of each CU determined by the encoding controller 107.

The prediction signal supplied from the predictor 105 is subtracted from input video of each CU in a shape determined by the encoding controller 107 to generate a prediction error image, and the prediction error image is input to the transformer/quantizer 101.

The transformer/quantizer 101 frequency-transforms the prediction error image to obtain a frequency transform coefficient.

The transformer/quantizer 101 further quantizes the frequency transform coefficient with a predetermined quantization step width Qs to obtain a transform quantization value.

The entropy encoder 102 entropy-encodes split_coding_unit_flag (see FIG. 24) supplied from the encoding controller 107, the prediction parameters, and the transform quantization value supplied from the transformer/quantizer 101.

The inverse transformer/inverse quantizer 103 inverse-quantizes the transform quantization value with the predetermined quantization step width Qs. The inverse transformer/inverse quantizer 103 further performs inverse frequency transform of the frequency transform coefficient obtained by the inverse quantization. The prediction signal is added to the reconstructed prediction error image obtained by the inverse frequency transform, and the result is supplied to the buffer 104.

The multiplexer 106 multiplexes and outputs the information on the predetermined area, the information on the number of motion vectors allowed per predetermined area, and output data of the entropy encoder 103. According to 4.1.2 Sequence parameter set RBSP syntax in NPL 2, the multiplexer 106 multiplexes num_successive_largest_coding_unit (the value of numSucLcu in the exemplary embodiment) and max_num_motion_vector syntax (the value of maxNumMV in the exemplary embodiment) as listed in FIG. 5.

Based on the operation mentioned above, the video encoding device according to this invention generates a bitstream.

The video encoding device in the exemplary embodiment includes the encoding control means for controlling the inter-PU partition type and inter prediction direction of a CU to be encoded based on the maximum number of motion vectors allowed for an image block having a predetermined area and the number of motion vectors of an encoded image block contained in the image block having the above predetermined area so that motion vectors greater in number than the maximum number of motion vectors allowed for the image block having the predetermined area will not be used within the predetermined area.

In other words, when the number of motion vectors of the encoded image block contained in the image block having the predetermined area is less than the maximum number of motion vectors, the video encoding device sets, in a predetermined inter-PU partition type, and entropy-encodes an inter-PU partition type syntax in a PU header layer of the CU to be encoded.

The memory bandwidth is reduced by preventing motion vectors greater in number than the maximum number of motion vectors from being used within the predetermined area. Further, since the number of inter-PU partition type syntaxes to be signaled is reduced by preventing the motion vectors greater in number than the maximum number of motion vectors from being used within the predetermined area, the percentage of the amount of code of a PU header in the bitstream is reduced, and hence the quality of video is improved.

Since the probability of occurrence of each inter-PU partition type varies to reduce entropy, the efficiency of entropy-encoding is improved. Thus, the quality of compressed video can be maintained while reducing the memory bandwidth.

The video encoding device in the exemplary embodiment embeds, in the bitstream, the information on the predetermined area and the information on the maximum number of motion vectors allowed for the image block having the predetermined area. Thus, since the information on the predetermined area and the maximum number of motion vectors allowed for the image block having the predetermined area are signaled to the video decoding device, the interoperability of the video encoding device and the video decoding device can be enhanced.

Exemplary Embodiment 2

A video encoding device in Exemplary Embodiment 2 includes: encoding control means for controlling an inter-PU partition type and an inter prediction direction based on a predetermined area set from the outside and the maximum number of motion vectors allowed for an image block having the predetermined area to control entropy-encoding of an inter-PU partition type syntax based on the number of motion vectors of an encoded image block contained in the image block having the predetermined area mentioned above; and means for embedding, in a bitstream, information on the predetermined area, information on the maximum number of motion vectors allowed for the image block having the predetermined area, and information on the number of motion vectors allowed per predetermined area to signal, to a video decoding device, the information on the maximum number of motion vectors allowed for the image block having the predetermined area and the information on the number of motion vectors allowed per predetermined area.

In this exemplary embodiment, it is assumed that the predetermined area is LCUs of successive numSucLcu, the maximum number of motion vectors allowed for the image block having the predetermined area is maxNumMV, and the number of motion vectors of an encoded CU contained in the image block within the predetermined area is currNumMV.

The structure of the video encoding device in the exemplary embodiment is the same as the structure of the video encoding device in Exemplary Embodiment 1 shown in FIG. 1.

The video encoding device in this exemplary embodiment shown in FIG. 1 differs from the video encoding device shown in FIG. 17 in that numSucLcu and maxNumMV are supplied to the encoding controller 107 to control the inter-PU partition and the inter prediction direction based on numSucLcu and maxNumMV. NumSucLcu and maxNumMV are also supplied to the multiplexer 106 to signal numSucLcu and maxNumMV to the video decoding device.

The encoding controller 107 has the predictor 105 calculate the R-D cost calculated from a coding distortion (the energy of an error image between an input signal and a reconstructed picture) and a generated bit count. The encoding controller 107 determines a CU splitting pattern in which the R-D cost is minimized (the splitting pattern determined by split_coding_unit_flag as shown in FIG. 24), and prediction parameters of each CU. The encoding controller 107 supplies the determined split_coding_unit_flag and prediction parameters of each CU to the predictor 105 and the entropy encoder 102. The prediction parameters are information associated with prediction of a CU to be encoded, such as prediction mode (pred_mode), intra-PU partition type (intra_split_flag), intra prediction direction, inter-PU partition type (inter_partitioning_idc), and motion vector.

Like in Exemplary Embodiment 1, the encoding controller 107 in the exemplary embodiment determines PU partition type and inter prediction direction candidates. The encoding controller 107 uses the determined PU partition and inter prediction direction candidates to determine prediction parameters based on the R-D cost.

When the prediction mode of a CU to be encoded is inter prediction and maxNumMV−currNumMV≤1, the encoding controller 107 in the exemplary embodiment controls the entropy encoder 102 not to entropy-encode inter_partitioning_idc.

The predictor 105 selects a prediction signal corresponding to the prediction parameters of each CU determined by the encoding controller 107.

The prediction signal supplied from the predictor 105 is subtracted from input video of each CU in a shape determined by the encoding controller 107 to generate a prediction error image, and the prediction error image is input to the transformer/quantizer 101.

The transformer/quantizer 101 frequency-transforms the prediction error image to obtain a frequency transform coefficient.

The transformer/quantizer 101 further quantizes the frequency transform coefficient with a predetermined quantization step width Qs to obtain a transform quantization value.

The entropy encoder 102 entropy-encodes split_coding_unit_flag (see FIG. 24) supplied from the encoding controller 107, the prediction parameters, and the transform quantization value supplied from the transformer/quantizer 101.

The inverse transformer/inverse quantizer 103 inverse-quantizes the transform quantization value with the predetermined quantization step width Qs. The inverse transformer/inverse quantizer 103 further performs inverse frequency transform of the frequency transform coefficient obtained by the inverse quantization. The prediction signal is added to the reconstructed prediction error image obtained by the inverse frequency transform, and the result is supplied to the buffer 104.

The multiplexer 106 multiplexes and outputs the information on the predetermined area, the information on the number of motion vectors allowed per predetermined area, and output data of the entropy encoder 102. According to 4.1.2 Sequence parameter set RBSP syntax in NPL 2, the multiplexer 106 multiplexes num_successive_largest_coding_unit (the value of numSucLcu in the exemplary embodiment) and max_num_motion_vector syntax (the value of maxNumMV in the exemplary embodiment) as listed in FIG. 5.

Based on the operation described above, the video encoding device of this invention generates a bitstream.

Figures 5, 6:
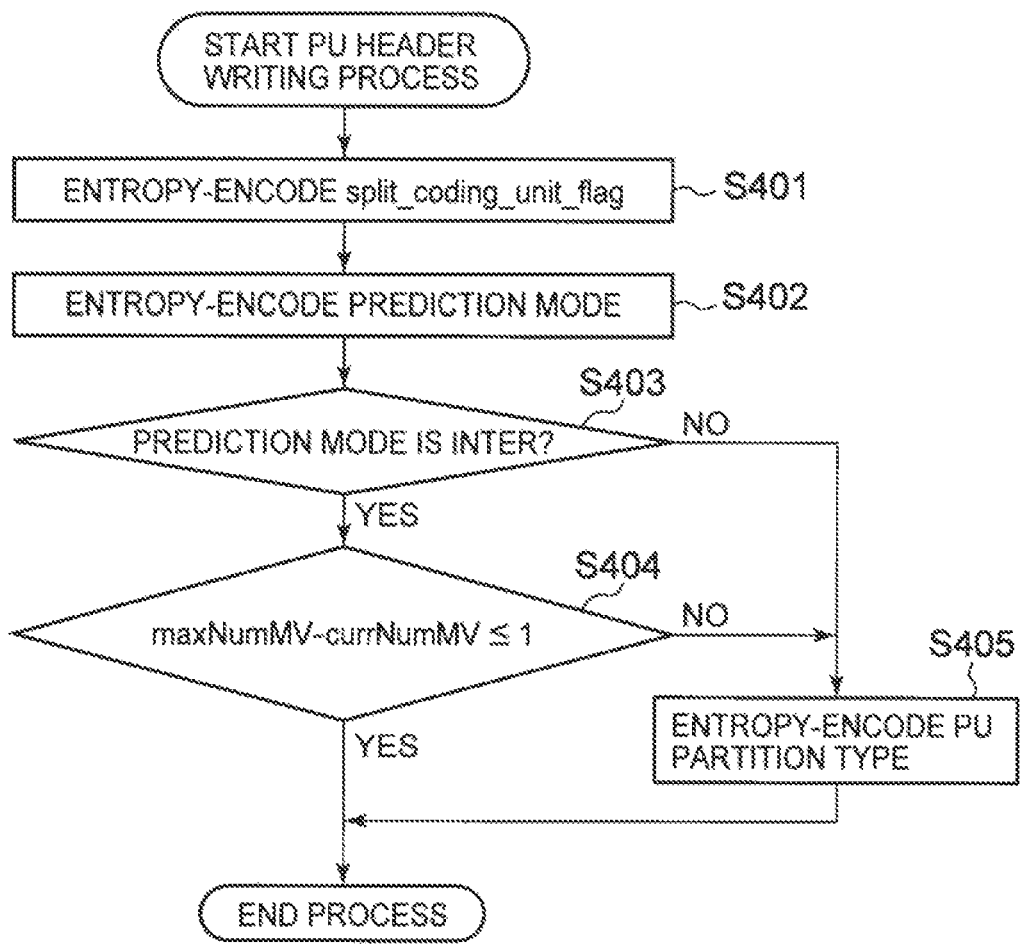
FIG. 5 is an explanatory diagram of a list indicative of information on a predetermined area and information on the maximum number of motion vectors allowed for an image block having the predetermined area in a sequence parameter set.
FIG. 6 is a flowchart showing a PU header writing operation.

Referring next to a flowchart of FIG. 6, description is made of an operation of writing the inter-PU partition type syntax that is a feature of the exemplary embodiment.

As shown in FIG. 6, the entropy encoder 102 entropy-encodes split_coding_unit_flag in step S401.

The entropy encoder 102 further entropy-encodes the prediction mode in step S402, i.e., the entropy encoder 102 entropy-encodes pred_mode syntax.

When determining in step S403 that the prediction mode of a CU to be encoded is inter prediction and determining in step S404 that maxNumMV−currNumMV≤1, the encoding controller 107 controls the entropy encoder 102 to skip entropy-encoding of inter_partitioning_idc syntax.

When determining in step S403 that the CU to be encoded is intra prediction, or when determining in step S404 that maxNumMV−currNumMV≥2, the encoding controller 107 controls the entropy encoder 102 to entropy-encode, in step S405, PU partition type information on the CU to be encoded.

According to 4.1.10 Prediction unit syntax in NPL 2, the above-mentioned pred_mode syntax and inter_partitioning_idc syntax are signaled as represented in a list shown in FIG. 7. The exemplary embodiment features that the inter_partitioning_idc syntax is signaled under the following condition: "if(maxNumMV−currNumMV>=2)," i.e., if the number of motion vectors obtained by subtracting the number of motion vectors of the encoded image block contained in the image block having the predetermined area from the maximum number of motion vectors allowed for the image block having the predetermined area is two or more.

The video encoding device in the exemplary embodiment includes the encoding control means for controlling an inter-PU partition type and an inter prediction direction based on the number of motion vectors (the maximum number of motion vectors−1 in the exemplary embodiment) allowed per predetermined area based on the maximum number of motion vectors allowed for an image block having the predetermined area. Since the video encoding device does not transmit unnecessary inter-PU partition type information, the ratio of the number of bits of the inter-PU partition type included in a bitstream can be kept low to reduce the memory bandwidth while maintaining the quality of compressed video.

Likewise, for video decoding, the video encoding device in the exemplary embodiment includes the means for embedding, in a bitstream, information on the predetermined area set from the outside, the maximum number of motion vectors allowed for the image block having the predetermined area, and the number of motion vectors allowed per predetermined area so that an inter-PU partition type syntax can be parsed from the bitstream. Thus, the interoperability of the video encoding device and the video decoding device can be enhanced.

Further, when the number of motion vectors of an encoded image block contained in the image block having the predetermined area is greater than or equal to a value obtained by subtracting one from the maximum number of motion vectors, the video encoding device in the exemplary embodiment performs control not to entropy-encode an inter-PU partition type syntax in a PU header layer of the CU to be encoded in order to reduce the number of inter-PU partition type syntaxes to be signaled, or performs control to signal the inter-PU partition type syntax only when the number of motion vectors is less than the value obtained by subtracting one from the maximum number of motion vectors. Since the reduction in the number of inter-PU partition type syntaxes to be signaled reduces the percentage of the amount of code of a PU header in the bitstream, the quality of video is further improved.

Exemplary Embodiment 3

A video decoding device in Exemplary Embodiment 3 decodes a bitstream generated by the video encoding device in Exemplary Embodiment 2.

The video decoding device in this exemplary embodiment includes: means for de-multiplexing information on a predetermined area and information on the number of motion vectors allowed for an image block having the predetermined area that are multiplexed into a bitstream; and parsing means for parsing an inter-PU partition type from the bitstream based on the number of motion vectors of an encoded image block contained in the image block having the predetermined area.

Figure 8:
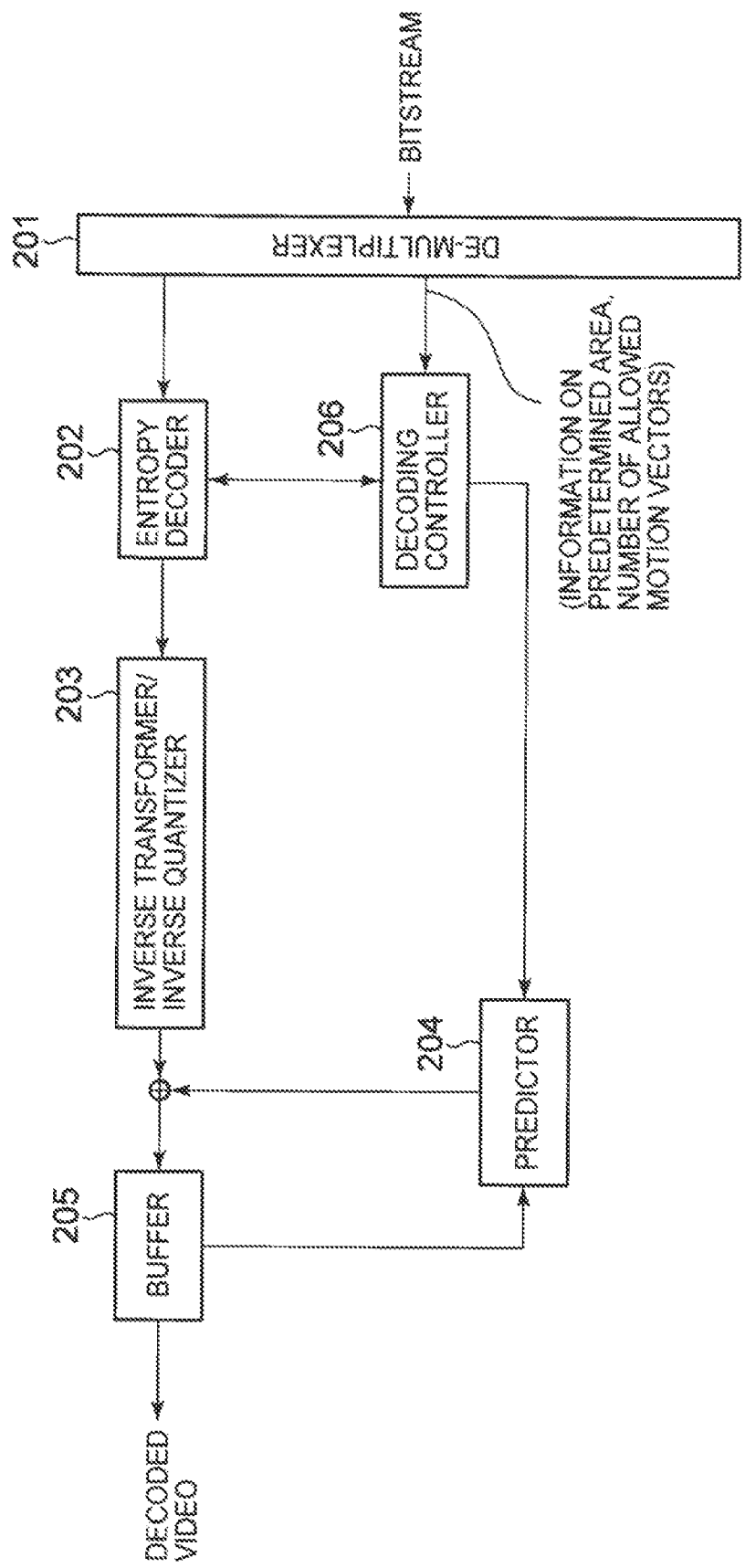
FIG. 8 is a block diagram of a video decoding device in Exemplary Embodiment 3.

As shown in FIG. 8, the video decoding device in the exemplary embodiment includes a de-multiplexer 201, an entropy decoder 202, an inverse transformer/inverse quantizer 203, a predictor 204, a buffer 205, and a decoding controller 206.

The de-multiplexer 201 de-multiplexes an input bitstream and extracts information on the predetermined area, information on the number of motion vectors allowed for the image block having the predetermined area, and an entropy-encoded video bitstream. The de-multiplexer 201 de-multiplexes num_successive_largest_coding_unit syntax and max_num_motion_vector syntax in sequence parameters as listed in FIG. 5.

The de-multiplexer 201 further supplies the information on the predetermined area and the maximum number of motion vectors allowed for the image block having the predetermined area to the decoding controller 206.

The entropy decoder 202 entropy-decodes the video bitstream. The entropy decoder 202 supplies an entropy-decoded transform quantization value to the inverse transformer/inverse quantizer 203. The entropy decoder 202 supplies entropy-decoded split_coding_unit_flag and prediction parameters to the decoding controller 206.

Suppose that the number of motion vectors of a decoded image block contained in the image block having the predetermined area is currNumMV. In this case, when the prediction mode of a CU to be decoded is inter prediction and maxNumMV−currNumMV≤1, the decoding controller 206 in the exemplary embodiment controls the entropy decoder 202 to skip entropy-decoding of the inter-PU partition type syntax of the CU to be decoded. The de-multiplexer 201 further sets the inter-PU partition type of the CU to be decoded to 2N×2N. When the prediction mode of the CU to be decoded is inter prediction, currNumMV is updated based on an inter prediction direction of each partition to be decoded following the inter-PU partition type. In other words, when the inter prediction direction of each partition is the bidirectional prediction, the decoding controller 206 sets currNumMV=currNumMV+2. Otherwise, the decoding controller 206 updates currNumMV=currNumMV+1 and currNumMV.

The inverse transformer/inverse quantizer 203 inverse-quantizes transform quantization values of luminance and color difference with a predetermined quantization step width. The inverse transformer/inverse quantizer 203 further performs inverse frequency transform of a frequency transform coefficient obtained by the inverse quantization.

After the inverse frequency transform, the predictor 204 generates a prediction signal using an image of a reconstructed picture stored in the buffer 205 based on the prediction parameters supplied from the decoding controller 206.

The prediction signal supplied from the predictor 204 is added to a reconstructed prediction error image obtained by the inverse frequency transform performed by the inverse transformer/inverse quantizer 203, and the result is supplied to the buffer 205 as a reconstructed picture.

The reconstructed picture stored in the buffer 205 is then output as a decoded image.

Based on the operation described above, the video decoding device in the exemplary embodiment generates a decoded image.

Figure 9:
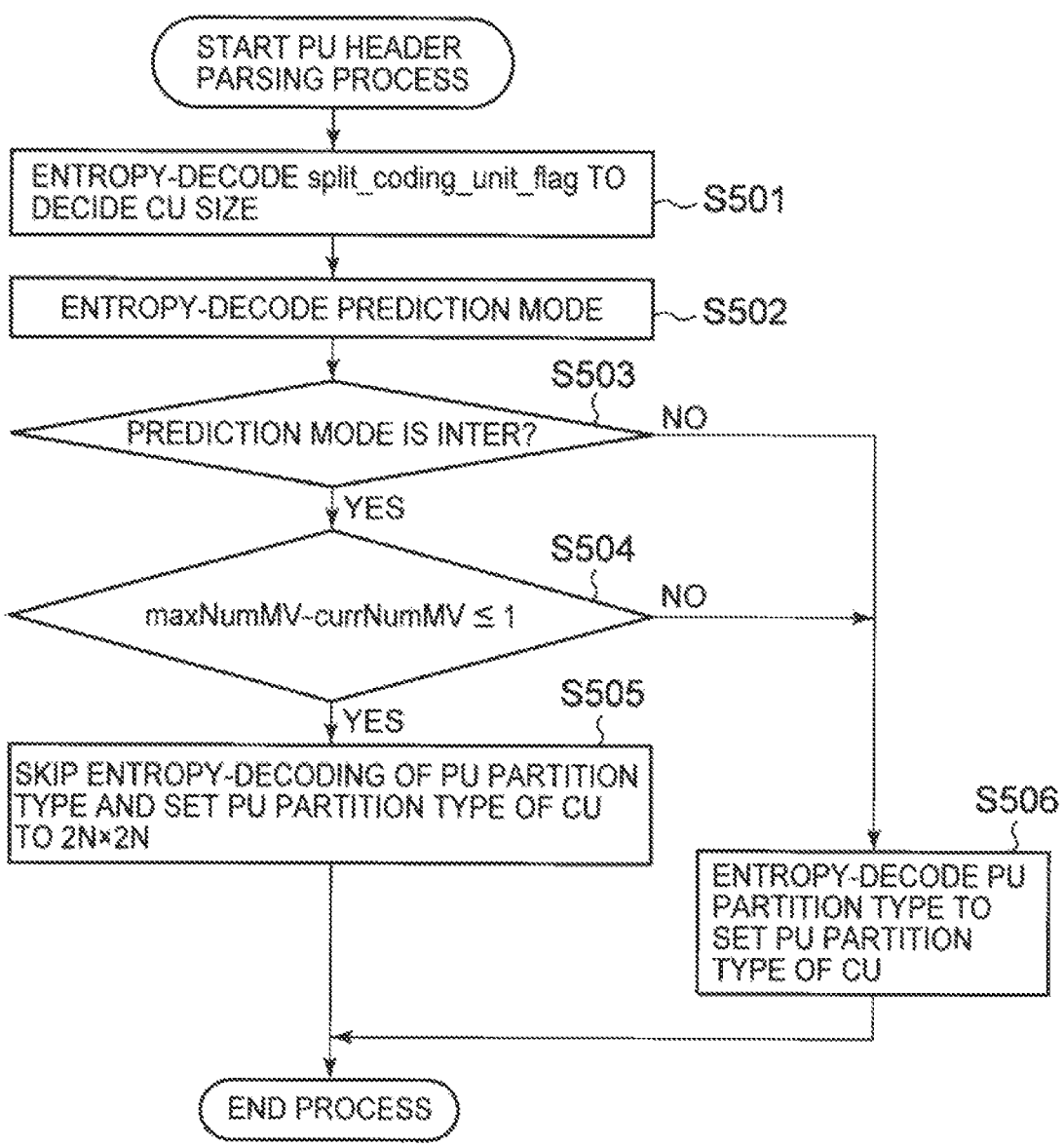
FIG. 9 is a flowchart showing a PU header parsing operation.

Referring next to a flowchart of FIG. 9, description is made of an operation of parsing the inter-PU partition type syntax that is a feature of the exemplary embodiment.

As shown in FIG. 9, the entropy decoder 202 entropy-decodes split_coding_unit_flag to decide the CU size in step S501.

Then, in step S502, the entropy decoder 202 entropy-decodes the prediction mode. In other words, the entropy decoder 202 entropy-decodes pred_mode syntax.

When determining in step S503 that the prediction mode is inter prediction and determining in step S504 that maxNumMV−currNumMV≤1, the decoding controller 206 controls the entropy decoder 202 in step S505 to skip entropy-decoding of the inter-PU partition type and to set the PU partition type of the CU to 2N×2N (inter_partitioning_idc=0).

When determining in step S503 that the prediction mode is intra prediction, or when determining in step S504 that maxNumMV−currNumMV≥2, the decoding controller 206 controls the entropy decoder 202 in step S506 to entropy-decode the PU partition type of the CU to be decoded and to set the PU partition type of the CU to a PU partition type obtained as a result of the entropy-decoding.

The video encoding device in Exemplary Embodiment 2 can multiplex, into a picture parameter set or a slice header, the information on the predetermined area (num_successive_largest_coding_unit) and the information on the number of motion vectors (max_num_motion_vector) allowed per predetermined area used in Exemplary Embodiment 1 as listed in FIG. 10 or FIG. 11. FIG. 10 is an explanatory diagram of a list indicative of information on the predetermined area and information on the maximum number of motion vectors allowed for an image block having the predetermined area in a picture parameter set. FIG. 11 is an explanatory diagram of a list indicative of information on the predetermined area and information on the number of motion vectors allowed for the image block having the predetermined area in a slice header.

Similarly, the video decoding device of the above invention can de-multiplex num_successive_largest_coding_unit syntax and max_num_motion_vector syntax from the picture parameter set or the slice header.

The video decoding device in the exemplary embodiment includes decoding control means for controlling an inter-PU partition type of a CU to be decoded and an inter prediction direction based on the maximum number of motion vectors allowed for an image block having a predetermined area and the number of motion vectors of an encoded image block contained in the image block having the predetermined area mentioned above so that motion vectors greater in number than the maximum number of motion vectors allowed for the image block having the predetermined area will not be used within the predetermined area.

Since motion vectors greater in number than the maximum number of motion vectors are prevented from being used within the predetermined area, the memory bandwidth is reduced.

Exemplary Embodiment 4

A video decoding device in Exemplary Embodiment 4 decodes a bitstream generated by the video encoding device in Exemplary Embodiment 1.

The video decoding device in this exemplary embodiment includes: means for de-multiplexing information on a predetermined area and information on the maximum number of motion vectors allowed for an image block having the predetermined area that are multiplexed into a bitstream; and error detection means for detecting an error in an access unit accessing the bitstream including a CU to be decoded, based on the number of motion vectors of an encoded image block contained in the image block having the predetermined area mentioned above. As defined in 3.1 access unit in NPL 1, the access unit is the unit of storing coded data for one picture. The error means violation of restrictions based on the number of motion vectors allowed per predetermined area.

Figure 12:
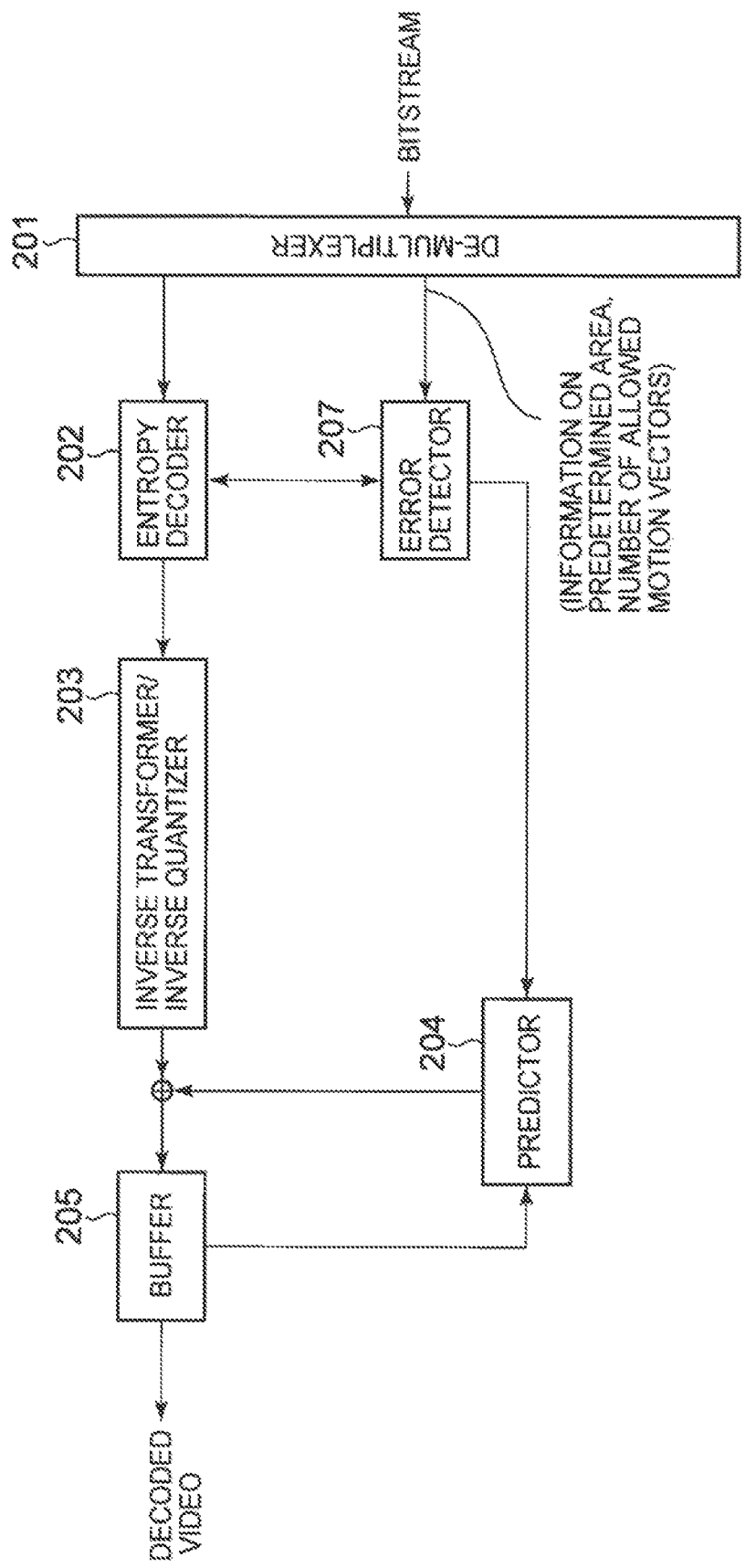
FIG. 12 is a block diagram of a video decoding device in Exemplary Embodiment 4.

As shown in FIG. 12, the video decoding device in the exemplary embodiment includes a de-multiplexer 201, an entropy decoder 202, an inverse transformer/inverse quantizer 203, a predictor 204, a buffer 205, and an error detector 207.

The de-multiplexer 201 operates the same way as the de-multiplexer 201 in Exemplary Embodiment 3 to de-multiplex an input bitstream and extract information on a predetermined area, information on the maximum number of motion vectors allowed for an image block having the predetermined area, and an entropy-encoded video bitstream. The de-multiplexer 201 de-multiplexes num_successive_largest_coding_unit syntax and max_num_motion_vector syntax in sequence parameters as listed in FIG. 5.

The de-multiplexer 201 further supplies the information on the predetermined area and the maximum number of motion vectors allowed for the image block having the predetermined area to the error detector 207.

The entropy decoder 202 entropy-decodes the video bitstream. The entropy decoder 202 supplies an entropy-decoded transform quantization value to the inverse transformer/inverse quantizer 203. The entropy decoder 202 then supplies entropy-decoded split_coding_unit_flag and prediction parameters to the error detector 207.

The error detector 207 performs error detection on the prediction parameters supplied from the entropy decoder 202 based on the information on the predetermined area and the maximum number of motion vectors allowed for the image block having the predetermined area supplied from the de-multiplexer 201, and supplies the result to the predictor 204. The error detection operation will be described later. The error detector 207 also plays a role as the decoding controller 206 in Exemplary Embodiment 3.

The inverse transformer/inverse quantizer 203 operates the same way as the inverse transformer/inverse quantizer 203 in Exemplary Embodiment 3.

The predictor 204 generates a prediction signal using an image of a reconstructed picture stored in the buffer 205 based on the prediction parameters supplied from the error detector 207.

The buffer 205 operates the same way as the buffer 205 in Exemplary Embodiment 3.

Based on the operation described above, the video decoding device in the exemplary embodiment generates a decoded image.

Figure 13:
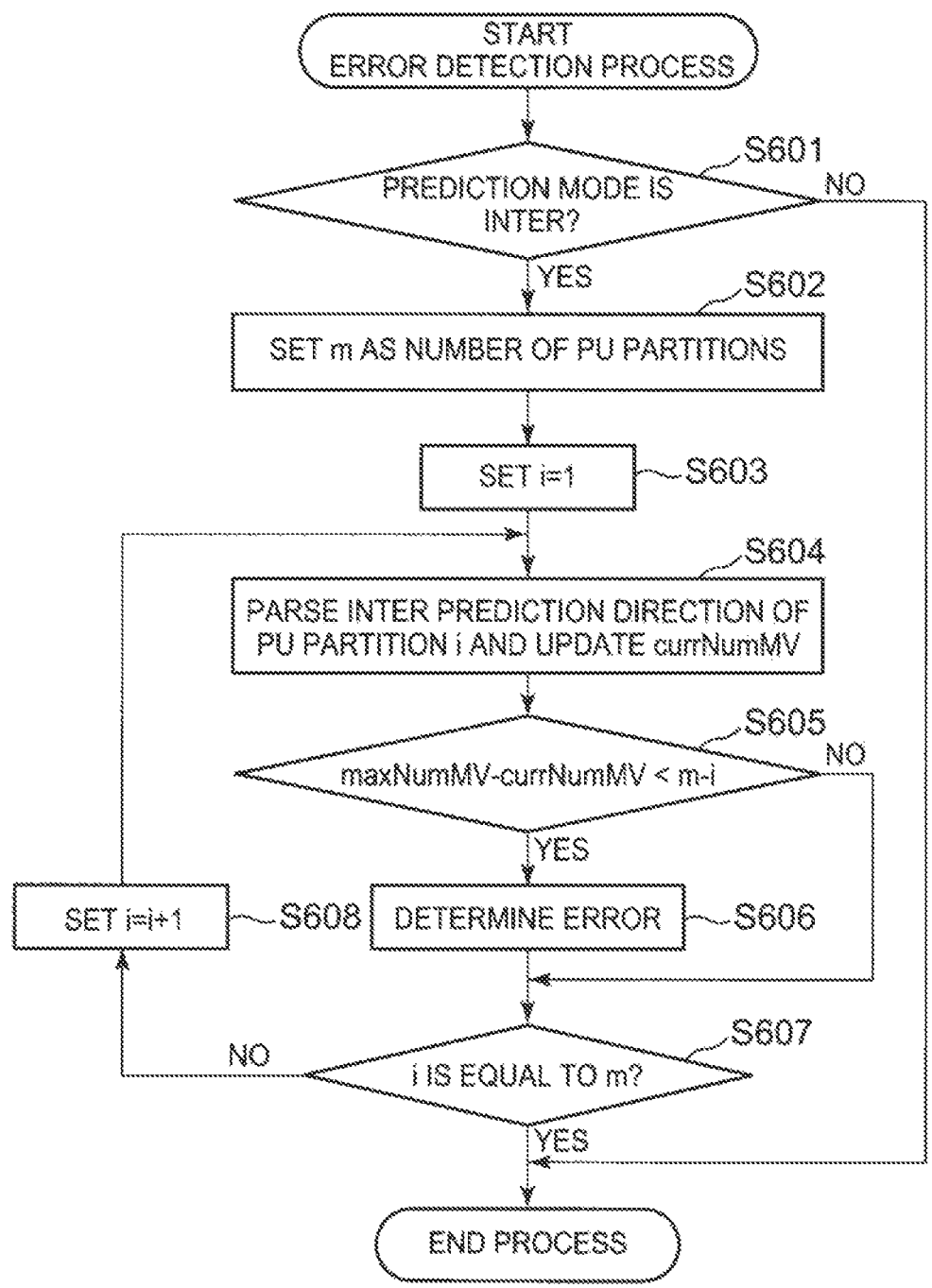
FIG. 13 is a flowchart showing an error detection operation.

Referring to a flowchart of FIG. 13, description is made of the error detection operation of the video decoding device in the exemplary embodiment to detect an error in an access unit accessing a bitstream including a CU to be decoded.

In step S601, when the error detector 207 determines that the prediction mode of a PU of the CU to be decoded is intra, the process is ended.

When the prediction mode is inter prediction, the error detector 207 sets m in step S602 as the number of PU partitions of the CU to be decoded.

In step S603, the error detector 207 sets i=1.

In step S604, the error detector 207 parses the inter prediction direction of partition i. In the case of bidirectional prediction, currNumMV=currNumMV+2 is set. Otherwise, currNumMV=currNumMV+1 and currNumMV are updated.

In step S605, when the number of motion vectors (maxNumMV−currNumMV) available for the remaining inter-PUs is less than the remaining number of partitions (m−i), the error detector 207 determines in step S606 that there is an error, and notifies the outside of the error. For example, the error detector 207 outputs the address of the CU in which the error has occurred.

When maxNumMV−currNumMV is greater than or equal to the remaining number of partitions (m−i), the procedure proceeds to step S607. When i is equal to m in step S607, the process is ended.

When i is different from m in step S607, the error detector 207 sets i=i+1 in step S608, and returns to step S604.

According to the above operation, the error detector 207 detects the error in an access unit accessing the bitstream including the CU to be decoded.

The video encoding devices and the video decoding devices of the above inventions control an inter-PU partition of a CU to be encoded, based on the maximum number of motion vectors allowed for an image block having a predetermined area, but similar control can be performed by using the maximum number of inter-PU partitions allowed for the image block having the predetermined area or the greatest amount of memory access allowed for the image block having the predetermined area.

Each of the aforementioned exemplary embodiments can be implemented in hardware or in a computer program.

Figure 14:
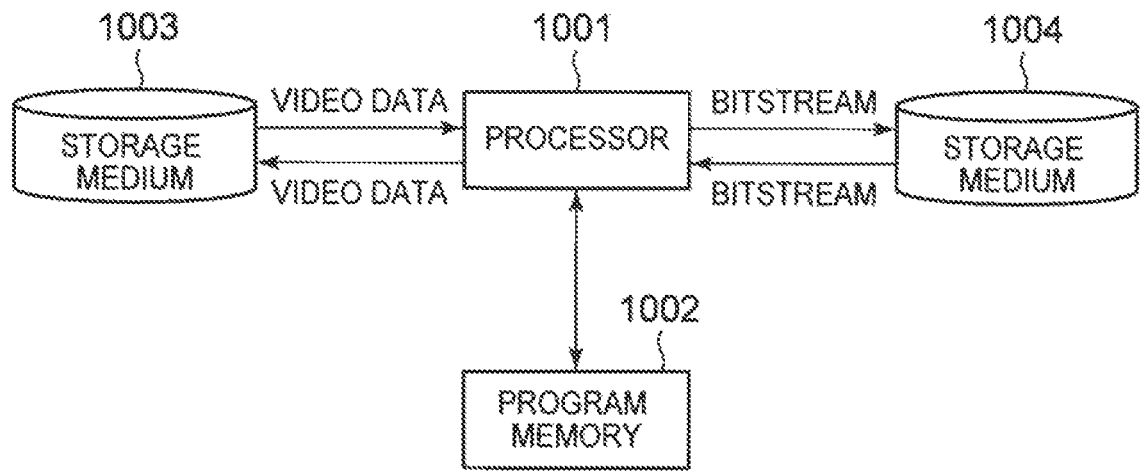
FIG. 14 is a block diagram showing a configuration example of an information processing system capable of implementing the functions of a video encoding device and a video decoding device according to the present invention.

An information processing system shown in FIG. 14 includes a processor 1001, a program memory 1002, a storage medium 1003 for storing video data, and a storage medium 1004 for storing a bitstream. The storage medium 1003 and the storage medium 1004 may be different storage media, or storage areas on the same storage medium. A magnetic medium such as a hard disk can be used as the storage medium.

In the information processing system shown in FIG. 14, a program for carrying out the function of each block (except the buffer block) shown in each of FIG. 1, FIG. 8, and FIG. 12 is stored in the program memory 1002. The processor 1001 performs processing according to the program stored in the program memory 1002 to carry out the functions of the video encoding device or the video decoding device shown in FIG. 1, FIG. 8, or FIG. 12, respectively.

Figure 15:
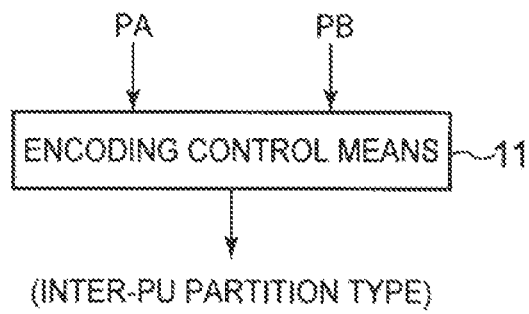
FIG. 15 is a block diagram showing a main part of a video encoding device according to the present invention.

FIG. 15 is a block diagram showing a main part of a video encoding device according to the present invention. As shown in FIG. 15, the video encoding device according to the present invention is a video encoding device for encoding video using inter prediction, including encoding control means 11 (the encoding controller 107 shown in FIG. 1 as an example) for controlling an inter-PU partition type of a CU to be encoded, based on the maximum number (PA) of motion vectors allowed for an image block having a predetermined area and the number (PB) of motion vectors of an encoded image block contained in the image block having the predetermined area.

Figure 16:
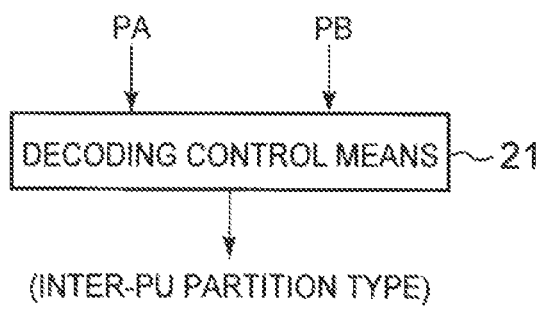
FIG. 16 is a block diagram showing a main part of a video decoding device according to the present invention.

FIG. 16 is a block diagram showing a main part of a video decoding device according to the present invention. As shown in FIG. 16, the video decoding device according to the present invention is a video decoding device for decoding video using inter prediction, including decoding control means 21 (the decoding controller 206 shown in FIG. 8 as an example) for controlling an inter-PU partition type of a CU to be decoded, based on the maximum number (PA) of motion vectors allowed for an image block having a predetermined area and the number (PB) of motion vectors of a decoded image block contained in the image block having the predetermined area.

While the present invention has been described with reference to the exemplary embodiments and examples, the present invention is not limited to the aforementioned exemplary embodiments and examples. Various changes understandable to those skilled in the art within the scope of the present invention can be made to the structures and details of the present invention.

This application claims priority based on Japanese Patent Application No. 2011-4963, filed on Jan. 13, 2011, the disclosures of which are incorporated herein in their entirety.

REFERENCE SIGNS LIST

- 11 encoding control means
- 21 decoding control means
- 101 transformer/quantizer
- 102 entropy encoder
- 103 inverse transformer/inverse quantizer
- 104 buffer
- 105 predictor
- 106 multiplexer
- 107, 108 encoding controller
- 201 de-multiplexer
- 202 entropy decoder
- 203 inverse transformer/inverse quantizer
- 204 predictor
- 205 buffer
- 206 decoding controller
- 207 error detector
- 1001 processor
- 1002 program memory
- 1003 storage medium
- 1004 storage medium

The invention claimed is:

1. A video encoding device for encoding video using inter prediction, comprising:
    an encoding control unit which controls inter-PU (Prediction Unit) partition type candidates of a CU (Coding Unit) to be encoded and inter prediction direction candidates of a CU to be encoded, based on a relationship between a maximum number of motion vectors allowed for an image block having a predetermined area and the number of motion vectors of an encoded CU contained in the image block having the predetermined area, wherein
    the inter-PU partition type candidates are made equal to inter-PU partition type candidates in a video decoding device, and
    the inter prediction direction candidates are made equal to inter prediction direction candidates in the video decoding device.

2. A video encoding method for encoding video using inter prediction, comprising:
    controlling inter-PU (Prediction Unit) partition type candidates of a CU (Coding Unit) to be encoded and inter prediction direction candidates of a CU to be encoded, based on a relationship between a maximum number of motion vectors allowed for an image block having a predetermined area and the number of motion vectors of an encoded CU contained in the image block having the predetermined area, wherein
    the inter-PU partition type candidates are made equal to inter-PU partition type candidates in a video decoding device, and
    the inter prediction direction candidates are made equal to inter prediction direction candidates in the video decoding device.

\* \* \* \* \*